US012770546B2

(12) United States Patent
Han et al.

(10) Patent No.: US 12,770,546 B2
(45) Date of Patent: Oct. 20, 2026

(54) DIGITAL DRIVING ON MICRODISPLAYS

(71) Applicant: Meta Platforms Technologies, LLC, Menlo Park, CA (US)

(72) Inventors: Junhan Han, Redmond, WA (US); Thomas Charisoulis, San Carlos, CA (US); Yun Wang, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 20 days.

(21) Appl. No.: 19/086,717

(22) Filed: Mar. 21, 2025

(65) Prior Publication Data

US 2025/0299615 A1 Sep. 25, 2025

Related U.S. Application Data

(60) Provisional application No. 63/568,840, filed on Mar. 22, 2024.

(51) Int. Cl.
*G09G 3/20* (2006.01)

(52) U.S. Cl.
CPC ... *G09G 3/2092* (2013.01); *G09G 2310/0259* (2013.01); *G09G 2320/0266* (2013.01); *G09G 2330/021* (2013.01); *G09G 2360/12* (2013.01)

(58) Field of Classification Search
None
See application file for complete search history.

(56) References Cited

U.S. PATENT DOCUMENTS

| | | | | |
|---|---|---|---|---|
| 11,399,147 | B2 * | 7/2022 | Koizumi | G06F 1/3212 |
| 12,603,053 | B2 * | 4/2026 | Kwon | G09G 3/3233 |
| 2003/0058235 | A1 * | 3/2003 | Moon | G09G 3/3696 345/212 |
| 2009/0128588 | A1 * | 5/2009 | Arai | G02B 27/09 345/690 |
| 2011/0025732 | A1 * | 2/2011 | Wang | G09G 5/10 345/87 |
| 2015/0103105 | A1 * | 4/2015 | Kim | G09G 3/3426 345/102 |
| 2020/0228768 | A1 * | 7/2020 | Nieten | H04N 9/3188 |
| 2024/0282269 | A1 * | 8/2024 | Lee | G09G 3/3614 |

* cited by examiner

*Primary Examiner* — Parul H Gupta
(74) *Attorney, Agent, or Firm* — Greenberg Traurig, LLP

(57) ABSTRACT

The disclosed computer-implemented method may include rendering frame data for pixel data values, converting a first part of each pixel data value using a first digital driving scheme, and converting a second part of each pixel data value using a second digital driving scheme. The method may also include displaying the frame data by driving pixels of a display using pulse width modulation based on a converted pixel value from the converted first and second portions of the pixel data value for each pixel. Various other methods, systems, and computer-readable media are also disclosed.

20 Claims, 18 Drawing Sheets

400
| Binary Code | Thermometer Code |
|---|---|
| 000 | 0000000 |
| 001 | 0000001 |
| 010 | 0000011 |
| 011 | 0000111 |
| 100 | 0001111 |
| 101 | 0011111 |
| 110 | 0111111 |
| 111 | 1111111 |
FIG. 4A
401
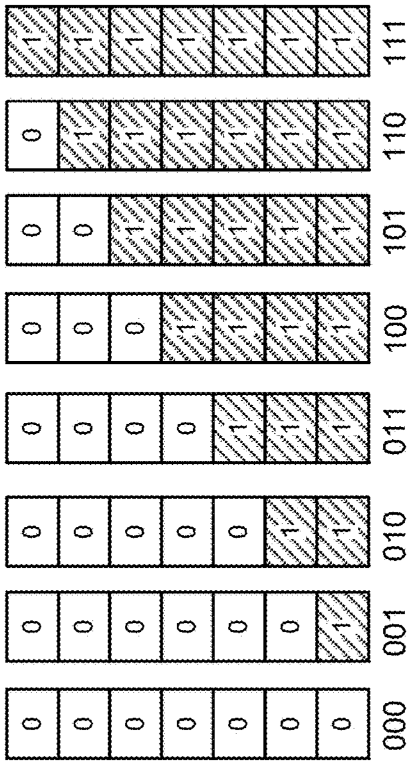
FIG. 4B
420
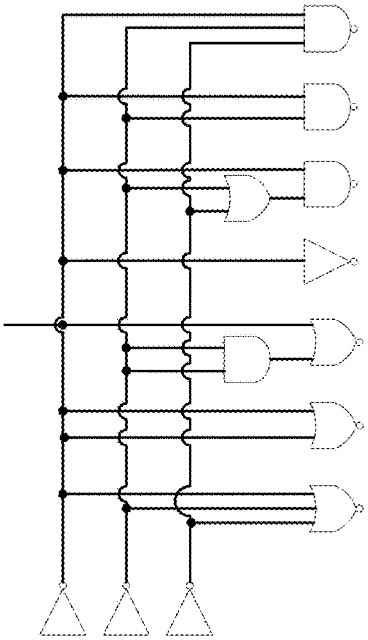
FIG. 4C

600

| Binary | | | | MSB Thermometer (15-Ramp) | | | | | | | | | | | | | | | LSB SF | | | |
|---|---|---|---|---|---|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 13 | 14 | 15 | 16 | 17 | 18 | 19 |
| 0 | 0 | 0 | 0 | | | | | | | | | | | | | | | | | | | |
| 0 | 0 | 0 | 1 | | | | | | | | | | | | | | | 1 | | | | 1 |
| 0 | 0 | 1 | 0 | | | | | | | | | | | | | | 1 | 1 | | | 1 | |
| 0 | 0 | 1 | 1 | | | | | | | | | | | | | 1 | 1 | 1 | | | 1 | 1 |
| 0 | 1 | 0 | 0 | | | | | | | | | | | | 1 | 1 | 1 | 1 | | 1 | | |
| 0 | 1 | 0 | 1 | | | | | | | | | | | 1 | 1 | 1 | 1 | 1 | | 1 | | 1 |
| 0 | 1 | 1 | 0 | | | | | | | | | | 1 | 1 | 1 | 1 | 1 | 1 | | 1 | 1 | |
| 0 | 1 | 1 | 1 | | | | | | | | | 1 | 1 | 1 | 1 | 1 | 1 | 1 | | 1 | 1 | 1 |
| 1 | 0 | 0 | 0 | | | | | | | | 1 | 1 | 1 | 1 | 1 | 1 | 1 | 1 | 1 | | | |
| 1 | 0 | 0 | 1 | | | | | | | 1 | 1 | 1 | 1 | 1 | 1 | 1 | 1 | 1 | 1 | | | 1 |
| 1 | 0 | 1 | 0 | | | | | | 1 | 1 | 1 | 1 | 1 | 1 | 1 | 1 | 1 | 1 | 1 | | 1 | |
| 1 | 0 | 1 | 1 | | | | | 1 | 1 | 1 | 1 | 1 | 1 | 1 | 1 | 1 | 1 | 1 | 1 | | 1 | 1 |
| 1 | 1 | 0 | 0 | | | | 1 | 1 | 1 | 1 | 1 | 1 | 1 | 1 | 1 | 1 | 1 | 1 | 1 | 1 | | |
| 1 | 1 | 0 | 1 | | | 1 | 1 | 1 | 1 | 1 | 1 | 1 | 1 | 1 | 1 | 1 | 1 | 1 | 1 | 1 | | 1 |
| 1 | 1 | 1 | 0 | | 1 | 1 | 1 | 1 | 1 | 1 | 1 | 1 | 1 | 1 | 1 | 1 | 1 | 1 | 1 | 1 | 1 | |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 6A

601

| Binary | | | | MSB Thermometer (7-Ramp) | | | | | | | | | | | | | | | LSB SF | | | |
|---|---|---|---|---|---|---|---|---|---|---|---|---|---|---|---|---|---|---|---|---|---|---|
| | | | | | 1 | | 2 | | 3 | | 4 | | 5 | | 6 | | 7 | 8 | 9 | 10 | 11 | 12 |
| 0 | 0 | 0 | 0 | | | | | | | | | | | | | | | | | | | |
| 0 | 0 | 0 | 1 | | | | | | | | | | | | | | | 1 | | | | 1 |
| 0 | 0 | 1 | 0 | | | | | | | | | | | | | 1 | 1 | | | | 1 | |
| 0 | 0 | 1 | 1 | | | | | | | | | | | | | 1 | 1 | 1 | | | 1 | 1 |
| 0 | 1 | 0 | 0 | | | | | | | | | | | 1 | 1 | 1 | 1 | | | 1 | | |
| 0 | 1 | 0 | 1 | | | | | | | | | | | 1 | 1 | 1 | 1 | 1 | | 1 | | 1 |
| 0 | 1 | 1 | 0 | | | | | | | | | 1 | 1 | 1 | 1 | 1 | 1 | | | 1 | 1 | |
| 0 | 1 | 1 | 1 | | | | | | | | | 1 | 1 | 1 | 1 | 1 | 1 | 1 | | 1 | 1 | 1 |
| 1 | 0 | 0 | 0 | | | | | | | 1 | 1 | 1 | 1 | 1 | 1 | 1 | 1 | | 1 | | | |
| 1 | 0 | 0 | 1 | | | | | | | 1 | 1 | 1 | 1 | 1 | 1 | 1 | 1 | 1 | 1 | | | 1 |
| 1 | 0 | 1 | 0 | | | | | 1 | 1 | 1 | 1 | 1 | 1 | 1 | 1 | 1 | 1 | | 1 | | 1 | |
| 1 | 0 | 1 | 1 | | | | | 1 | 1 | 1 | 1 | 1 | 1 | 1 | 1 | 1 | 1 | 1 | 1 | | 1 | 1 |
| 1 | 1 | 0 | 0 | | | 1 | 1 | 1 | 1 | 1 | 1 | 1 | 1 | 1 | 1 | 1 | 1 | | 1 | 1 | | |
| 1 | 1 | 0 | 1 | | | 1 | 1 | 1 | 1 | 1 | 1 | 1 | 1 | 1 | 1 | 1 | 1 | 1 | 1 | 1 | | 1 |
| 1 | 1 | 1 | 0 | 1 | 1 | 1 | 1 | 1 | 1 | 1 | 1 | 1 | 1 | 1 | 1 | 1 | 1 | | 1 | 1 | 1 | |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 6B

DIGITAL DRIVING ON MICRODISPLAYS

CROSS REFERENCE TO RELATED APPLICATION

This application claims the benefit of U.S. Provisional Application No. 63/568,840, filed 22 Mar. 2024, the disclosures of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

FIGS. 4A-C illustrate bit conversion for a ramp driving scheme.

FIGS. 6A-B illustrate hybrid ramp driving schemes.

Figure 1:
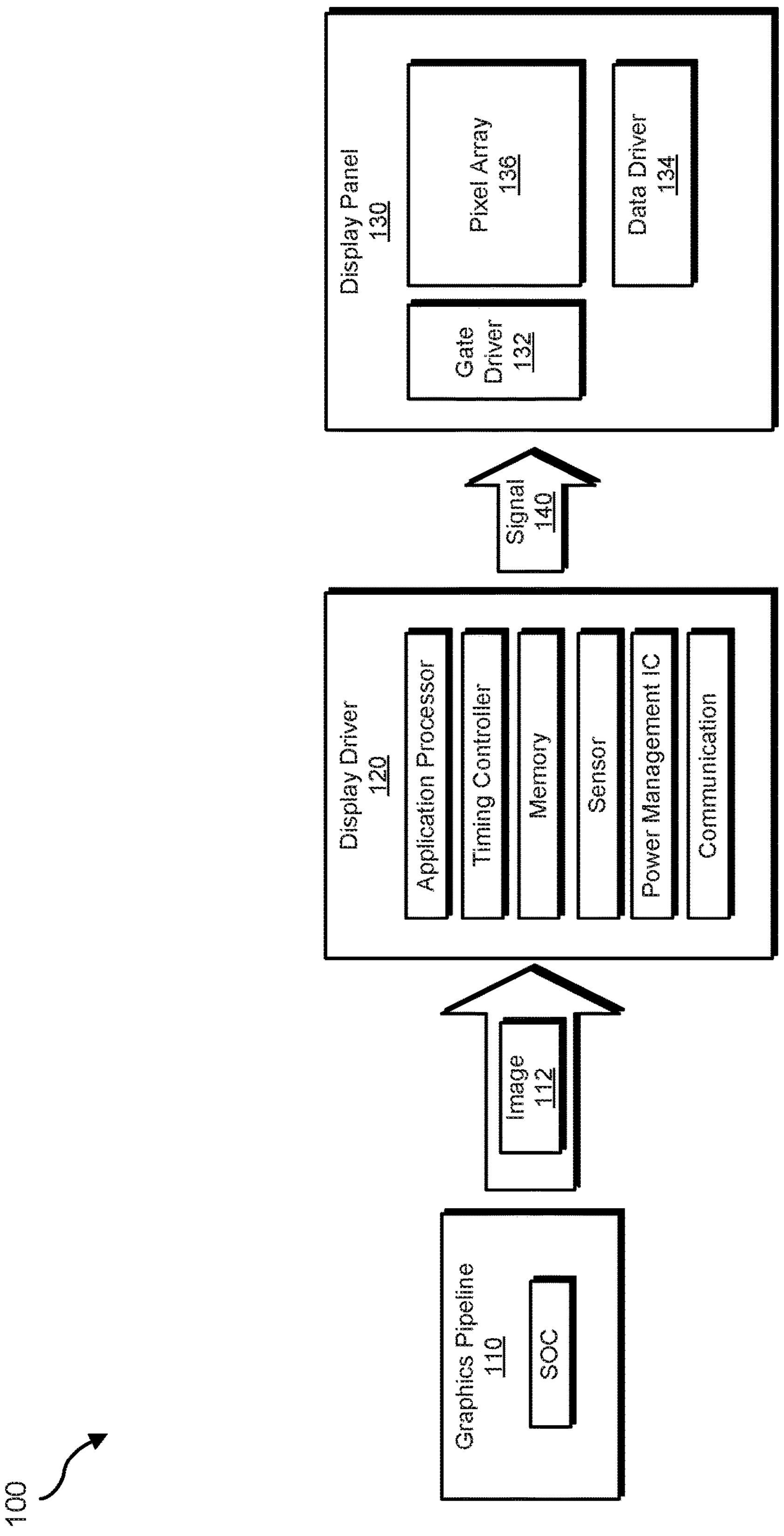
FIG. 1 illustrates an example display pipeline for displaying an image.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Extended reality, augmented reality, virtual reality, and/or other mixed reality systems utilize wearable displays designed for improving field of view (FOV), visual acuity of pixel per degree (PPD), weight, battery life, and motion-to-photon latency. A microdisplay on a silicon backplane is a display architecture that may be useful for such systems due to its small form factor, higher pixel density, and low power consumption.

A microdisplay may also be called an on-silicon-display to distinguish the silicon backplane from conventional display on glass backplane of LCD and OLED architectures. The on-silicon-displays may be liquid crystal on silicon (LCoS), OLED on silicon (OLEDoS), and μLED. OLEDoS may also be called μOLED, similar to μLED. However, these on-silicon-display technologies may exhibit a gap from the human perception limit with respect to PPD and FOV. Although a higher resolution display may bridge this gap between the technology and human perception, such a higher resolution display may require higher power consumption to drive the display, which in some form factors may not be available. Thus, a high-resolution microdisplay with low power consumption is desirable.

With respect to microdisplays, the silicon backplane may be superior to a glass substrate in achieving higher resolution and/or higher pixel density display. Complementary Metal-oxide semiconductor (CMOS) transistors have superior electrical characteristics for scaling down pixel size compared to the thin-film-transistors (TFT) on glass backplanes. However, the different transistor types have different electrical characteristics, such as mobility, threshold voltage, and uniformity. Accordingly, each backplane technology may require a different driving architecture to utilize advantages and to compensate for the disadvantages of the transistor type.

Conventional displays often convert input digital data to an analog signal, which may be optimized for driving TFTs on glass. For silicon backplane technology, a different optimized architecture may be desired for a microdisplay. If the microdisplay uses the input digital data directly without first converting into analog value, the digital driven display may benefit from utilizing digital signal, optimized for CMOS transistor by removing the signal conversion process. Although digital driving on a silicon backplane provides certain advantages, such display architectures may also introduce undesired visual artifacts. Moreover, although increasing frames per second (FPS) may address such undesired visual artifacts, the increased power consumption may render this unfeasible.

The present disclosure is generally directed to digital driving on microdisplays. As will be explained in greater detail below, embodiments of the present disclosure may convert each pixel data value for a rendered frame of pixel data values using a hybrid digital driving scheme, having at least a first portion of each pixel data value is converted with a first digital driving scheme, and at least a second portion of the pixel data value converted using a second digital driving scheme, and displaying each frame based on the converted pixel data values. Converting pixel data values using the hybrid digital driving scheme may improve performance of a display device (e.g., reducing visual artifacts) and further reduce computing/memory/bandwidth requirements for storing and transmitting the converted pixel data values. The systems and methods provided herein may further improve the technical field of displays, such as microdisplays, by allowing the described advantages without requiring framebuffers or otherwise exceeding constraints (e.g., physical/size limitations, power consumption, thermal requirements, etc.).

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-8, detailed descriptions of digital driving on microdisplays. Descriptions of example systems will be provided in connection with FIGS. 1 and 7. Detailed descriptions of analog and digital driving will be provided in connection with FIGS. 2A-2B. Detailed descriptions of various digital driving schemes will be provided in connection with FIGS. 3A-3C, and 4A-4C. Detailed descriptions of various hybrid digital driving schemes will be provided in connection with FIGS. 5A-5B and 6A-6B. In addition, detailed descriptions of an example method of digital driving using a hybrid digital driving scheme will be provided in connection with FIG. 8.

FIG. 1 illustrates an example system 100 for a display, including a graphics pipeline 110 for sending an image 112 (e.g., frame data) to a display panel 130. Although not illustrated in FIG. 1, system 100 may be part of a computing system and/or computing device including one or more processors and memory. Graphics pipeline 110 may represent any graphics rendering hardware (e.g., system-on-chip (SOC)) and/or software (not illustrated in FIG. 1), such as one or more processors (e.g., general purpose processors and/or graphics processors), memory devices, etc. for rendering image 112, which may correspond to one or more frames (e.g., representing values for each display pixel) to be displayed. Graphics pipeline 110 may send image 112 to a display driver 120.

Display driver 120 may generally represent an integrated circuit, such as a display driver integrated circuit (DDIC), and/or other circuitry for controlling or otherwise providing an interface to a display device, such as display panel 130. Display driver 120 may receive data and/or commands which may be converted into appropriate control signals for display panel 130 to display the desired image. Although not fully illustrated, display driver 120 may include various components/circuits, including but not limited to an application processor, a timing controller, a memory, a sensor, a power management integrated circuit, a communication circuit (e.g., video interface and/or a transmit circuit), etc. Display driver 120 may accordingly convert image 112 into a signal 140 for controlling display panel 130, as will be described further below.

Display panel 130 may correspond to any display device, such as a microdisplay (e.g., microLED, OLED, liquid crystal, etc.) or other display. Display panel 130 may include a pixel array 136 representing an array of pixels (e.g., each pixel implemented with a circuit for producing/absorbing light at one or more wavelengths, etc.) which may be controlled via circuits such as a gate driver 132 and/or a data driver 134, although in other examples, other types of control circuits may be used. Gate driver 132 and/or data driver 134 may use signal 140 to control particular pixels for producing a desired display (e.g., representing image 112). Although not illustrated, display panel 130 may include additional components/circuits such as a receiver circuit, demultiplexers, level shifters, row drivers, pixel circuits (e.g., as part of pixel array 136 which may include components such as a memory-in-pixel (MIP) for holding a pixel value for a given frame, etc.). Further, although the examples herein refer to "pixel," in some implementations a pixel may refer to a sub-pixel (e.g., red, green, and blue sub-pixels for an RGB pixel).

In some examples, display driver 120 may include a buffer (e.g., a memory device) for holding image 112 as it sends signal 140 line-by-line for a given frame to display panel 130, which may accordingly activate pixel array 136 line-by-line. In some examples, display driver 120 may include a frame buffer such that graphics pipeline 110 may send image 112 as a full frame (e.g., pixel data for a full frame). Display driver 120 may accordingly send the buffered frame line-by-line as signal 140. In other examples, display driver 120 may include a smaller buffer configured to hold a subframe or other subdivision of a frame. For instance, display driver 120 may include a line frame for holding pixel data for a line of the frame such that graphics pipeline 110 may send image 112 by the appropriate subdivision of the frame (e.g., line-by-line), which display driver 120 may use for controlling display panel 130 line-by-line. In other words, display driver 120 may include a buffer configured based on how pixels in pixel array 136 may be controlled. Display driver 120 may receive and buffer a line, and send the buffered line as signal 140 while receiving/buffering a next line. In yet other examples, display driver 120 may not include or otherwise forego a frame buffer, subframe buffer, line buffer, etc. For example, display driver 120 may receive the frame data line-by-line as well as send signal 140 line-by-line as received.

Display devices often present data by changing its brightness (e.g., for each pixel). Changing the brightness may include pulse amplitude modulation (PAM) and/or pulse width modulation (PWM), as will be discussed further with respect to FIGS. 2A-2B.

Figure 2A:
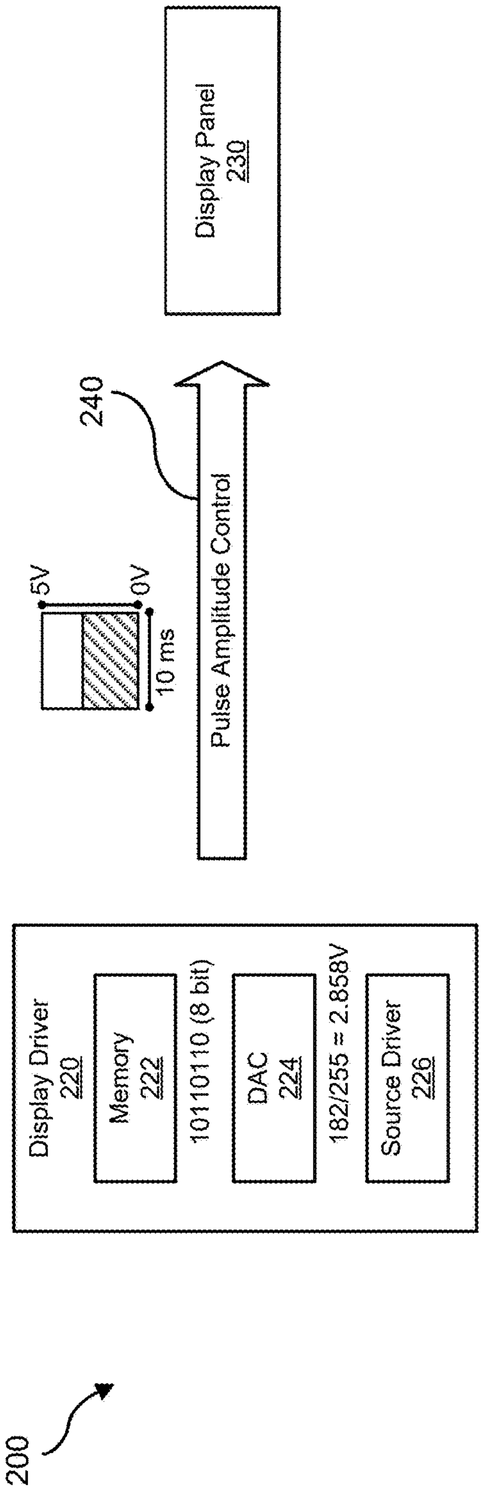
FIGS. 2A-B illustrate examples of driving displays.

FIG. 2A illustrates a display system 200 corresponding to at least portions of system 100, including a display driver 220 (corresponding to display driver 120), a signal 240 (corresponding to signal 140), and a display panel 230 (corresponding to display panel 130). Display driver 220 may include a memory 222 which may store image/frame data (e.g., image 112). In some examples, memory 222 may correspond to a buffer for temporarily holding frame data. Further, in some examples, memory 222 may store one or more complete frames (e.g., values for each pixel of each frame), although in other examples may store one or more partial frames (e.g., one or more lines of pixel data for one or more frames).

FIG. 2A illustrates a pulse amplitude control signal for signal 240 (e.g., an analog driving display). In FIG. 2A, an example pixel value may be represented by an 8-bit value (e.g., "10110110"), although in other examples any other bit width may be used. A digital-to-analog converter (DAC) 224 (corresponding to any DAC circuit for converting digital values to an analog value such as a voltage) may convert the 8 bit value into an analog value (e.g., 0-255 as represented by 8 bits into a voltage between 0 and 5 V, although in other examples other voltage ranges may be used), which may correspond to 2.858 V. Source driver 226 may send this analog value as signal 240. Display panel 230 may receive signal 240, and power on the corresponding pixel at the corresponding voltage for the pulse duration (e.g., 10 ms). In other words, signal 240 controls the amplitude (e.g., brightness) of the pulse for the corresponding pixel.

Display driver 220 may include one or more storage capacitors for storing the analog signal. In addition, source driver 226 may require a highly precise operation accuracy for writing the data voltage (e.g., converted analog signal) into the storage capacitor(s). Higher resolution display may require higher-performance source drivers, which may have higher power consumption. For example, for 4K resolution μOLED displays, a majority of the power in the analog driving may be consumed in the source driver. For instance, thousands of source drivers may be simultaneously charging and discharging with precise voltage into the storage capacitors through the parasitic elements in microseconds. Digital driving may deliver the input digital video data into the memory in pixels. By eliminating the analog portion in circuitry, the driving power may be reduced, for example from an estimate of 997 mW to 445 mW. While the analog circuitry may consume around 70% of its power budget, the additional digital power from digital driving may be relatively small, realizing power efficiency.

Thus, a digital driving architecture may improve (e.g., reduce) power consumption. A memory-in-pixel (MIP) allows regenerating the digital data signal with supply voltages, as a digital source driver may deliver the digital data within a noise margin, as opposed to the higher precision required for the analog signal.

Figure 2B:
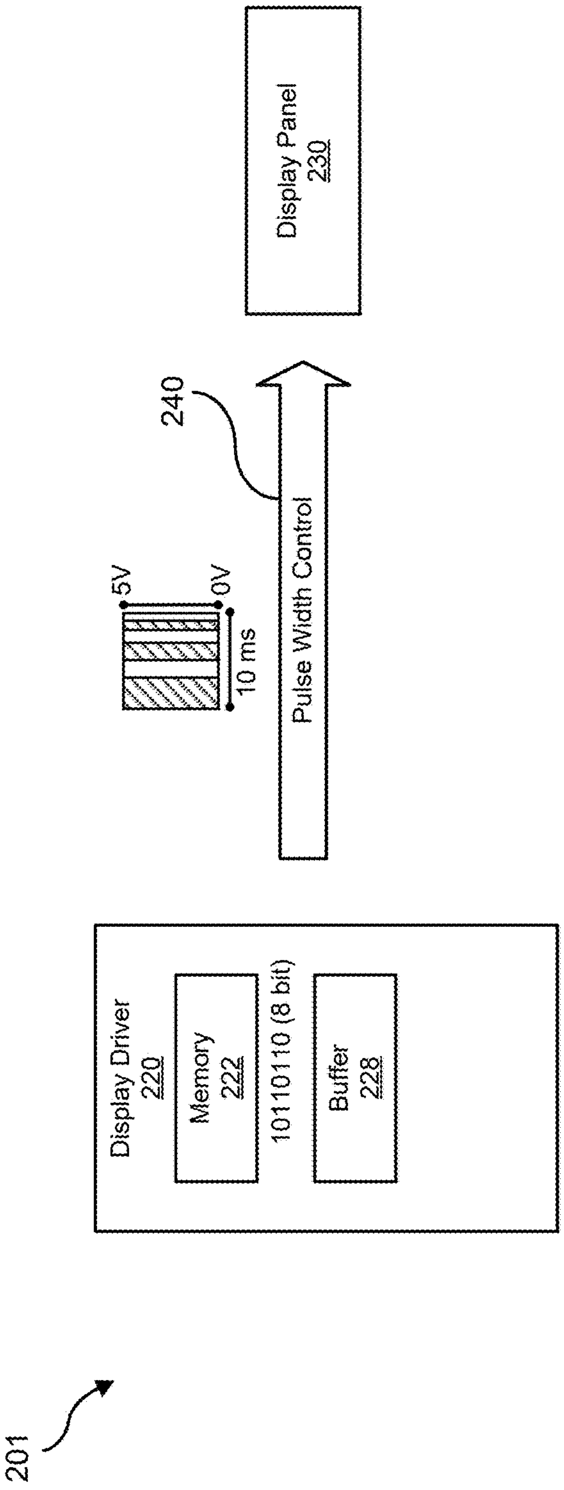

FIG. 2B illustrates a display system 201 using a pulse width control signal for signal 240 (e.g., a digital driving display). Similar to FIG. 2A, the example pixel value may be represented by the 8-bit value (e.g., "10110110"). However, in contrast to FIG. 2A, display driver 220 in FIG. 2B may include a buffer 228 corresponding to a buffer for storing pixel values to be sent to display panel 230 (e.g., a frame buffer, line buffer, etc.). Rather than using an analog value converted from the 8-bit value, display panel 230 may use the digital 8-bit value to control pulse widths. For the pulse (e.g., 10 ms), given amplitude (e.g., full brightness) may turned on and off for specific pulse widths (e.g., modulating pulse widths) based on the 8-bit value, as will be described further below. In other words, signal 240 controls the pulse width using a digital driving scheme or pulse width modulation (PWM) scheme.

Figure 3A:
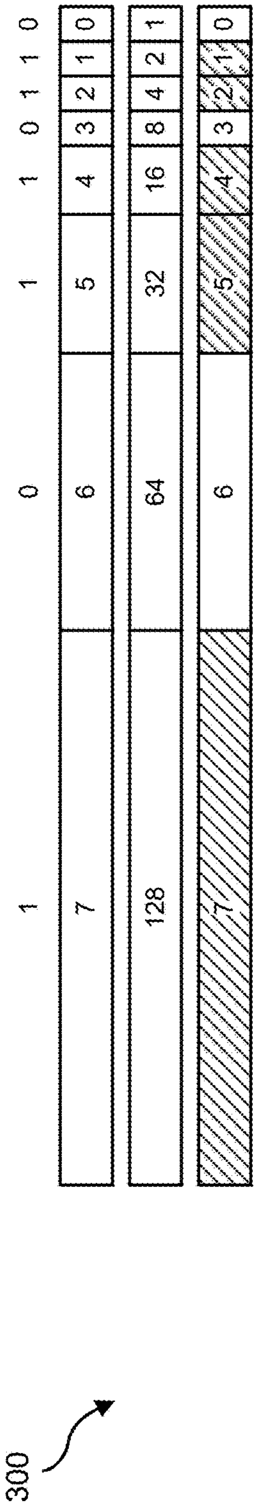
FIG. 3A-C illustrate example digital driving schemes.
Figure 3B:
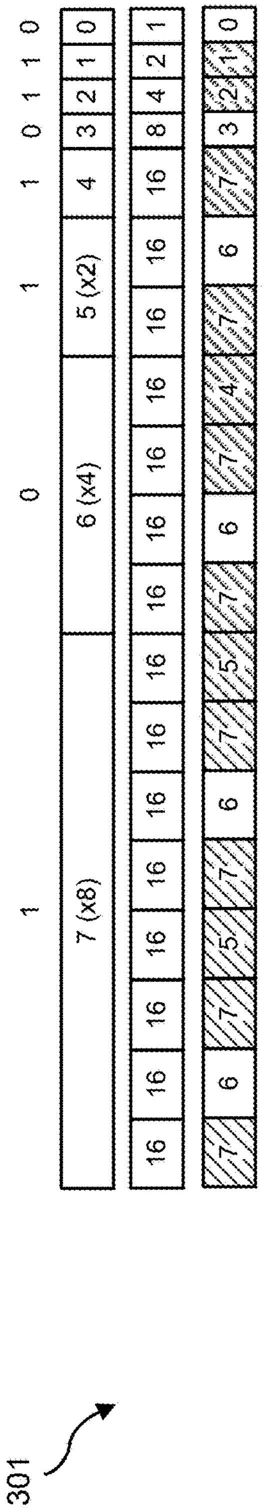
Figure 3C:
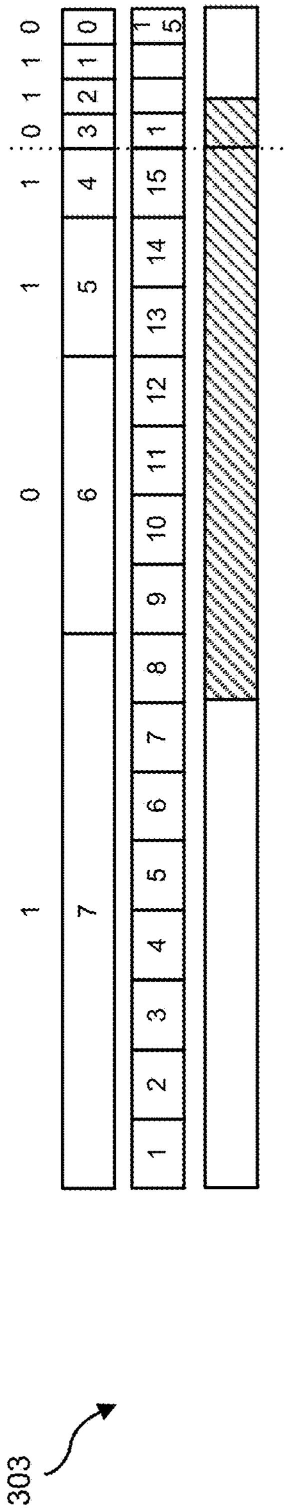

FIGS. 3A-3C illustrate various digital driving or PWM driving schemes. FIG. 3A illustrates a bit plane scheme 300. FIG. 3B illustrates a subframe scheme 301. FIG. 3C illustrates a ramp scheme 303, also referred to as a thermometer scheme. For example purposes, the same 8-bit digital value ("10110110") from FIGS. 2A-2B is described.

In FIG. 3A, each bit from the digital value may represent a particular pulse width. In some examples, more significant bits may represent larger/longer pulse widths and less significant bits may represent smaller/shorter pulse widths. For example, if counting the 8 bits as bit 0 (least significant bit LSB) to bit 7 (most significant bit MSB) and dividing the entire frame time (e.g., 10 ms) into 255 segments (e.g., based on the 8 bits, similar to the 0-255 scale as used for the analog conversion), bit 7 (MSB) may represent 128 of the 255 segments, bit 6 may represent 64 of the 255 segments, bit 5 may represent 32 of the 255 segments, and so forth, with bit 0 representing 1 of the 255 segments, as illustrated by the top row (bit index) and middle row (segment length) in FIG. 3A. In other words, a bit plane may represent a set of bits corresponding to a given bit significance, which may grow exponentially from the LSB to the MSB as described. Thus, for "10110110," bit 7 (having value "1") may be on for the corresponding duration (illustrated as a shaded box for bit 7 in the bottom row), bit 6 (having value "0") may be off for the corresponding duration (illustrated as a blank box for bit 6 in the bottom row), and so forth.

The scheme illustrated in FIG. 3A may also be referred to as bit plane driving. However, bit plane driving may exhibit certain visual artifacts. Visual artifacts are often related to the human's eye and head movement. For instance, saccade (e.g., a rapid movement of the eye due to fixation on one point after another), may cause dynamic false contouring (DFC) in which the human eye may accept wrong grayscale data depending on a time scale between pixels, and color breakup (CBU) artifacts in which the human eye accepts wrong color data depending on a time scale between pixels (e.g., with respect a color sequential display in which red, green, and blue colors share a same pixel location and displayed in sequence rather than having red, green, and blue sub-pixels to achieve a higher PPI in a microdisplay). In addition, vestibulo ocular reflex (VOR) may refer to when a human's head moves, an eye reflex movement to stabilize gaze during the movement (e.g., if the head moves to the left, the eye moves to the right to stay the same gaze point during the movement) may introduce judder noise. Further, a motion to photon latency may also relate to a head movement, which refers to a delay from the human's head movement to reflecting the movement on the display output (e.g., delays/latency from sensors, computation, graphics pipeline overhead, etc.).

To reduce visual artifacts (e.g., DFC), a sub-framing driving scheme may sub-divide the segments into subfields to distribute the weight of the MSB over the frame time. As illustrated in FIG. 3B (e.g., the bottom row), the segments corresponding to the indexes may be sub-divided and interleaved for better distribution over the frame time. Although FIG. 3B illustrates one example distribution, other examples may be used.

For further artifact reduction, a ramp driving scheme may be used, as in FIG. 3C. In a ramp scheme (also called a thermometer scheme), the pulses widths may also correlate to significance, but explicitly represented by bits (e.g., longer pulse widths converted into additional bits), and the pulse may be coalesced into a continuous pulse rather than having discrete pulses. For example, in FIG. 3C, the MSB (e.g., bit 7) may be represented by 8 bits (as illustrated in the middle row bits 1-8), bit 6 may be represented by 4 bits (as illustrated in the middle row bits 9-12) and so forth. Further, in FIG. 3C, the 4 least significant bits (e.g., bits 3 to 0), may similarly be represented by multiple bits (bits 1-15 in the middle row). The ramp driving scheme will be explained further with respect to FIGS. 4A-4C.

FIG. 4A illustrates a table 400 of converting a binary code (e.g., a 3-bit digital value) into a thermometer code (e.g., a 7-bit bitstring). In some examples, the conversion may correspond to converting the binary number value into a number of "on" (e.g., "1") bits. For example, "000" may correspond to 0 "on" bits, e.g., "0000000," whereas "111" may correspond to 7 "on" bits, e.g., "1111111." The "on" bits may correspond to time segments for turning on a given pixel.

FIG. 4B illustrates a chart 401 for the various thermometer codes corresponding to "on" segments. As illustrated in FIG. 4B, the increasing binary code values may correspond to increasing "on" segment durations, as in a ramping up of the on duration (e.g., pulse width), from "000" (representing 0 pulse width) to "111" (representing a full or maximum pulse width).

FIG. 4C illustrates a circuit 420 representing an example circuit for converting binary codes to thermometer codes (e.g., FIG. 4A), for example inputting each bit of the binary code into the left inputs, with bottom outputs of the bits for the thermometer code. Although FIGS. 4A-4C illustrate a 3-bit to 7-bit example, in other example, other bit lengths may be used, generally converting a binary code into a bitstring having a bit length corresponding to a highest binary value of the binary code (e.g., 4-bit binary code into a 15-bit bitstring).

Returning to FIG. 3C, FIG. 3C illustrates an example using the 4 MSBs converted to a first thermometer code, and the 4 LSBs converted to a second thermometer code. The 4 MSBs and 4 LSBs may represent similar time segment widths as in FIG. 3A or 3B (e.g., exponential increase from LSB to MSB) such that the first thermometer code (e.g., represented by the first shaded bar in the third row in FIG. 3C) may represent longer time segments than the second thermometer code (e.g., represented by the second shaded bar in the third row in FIG. 3C). Thus, using thermometer codes allow consolidating various smaller segments into one contiguous segment (e.g., FIGS. 3A, 3B, and 3C illustrating the same total pulse duration).

Graphics pipeline 110 may convert a given pixel value into a thermometer code, and send (as image 112, which may be sent as a full frame or subdivision of a frame such as line-by-line) to display driver 120, which in some examples may buffer the received thermometer code, and send (as signal 140, which may be sent as a full frame or subdivision of a frame such as line-by-line) to display panel 130. However implementing a ramp driving scheme as in FIG. 3C may require increased bandwidth. For instances, as shown in FIG. 3C, the 4 MSBs may be converted into a 15-bit value, and the 4 LSBs may be converted into a 15-bit value. In other words, the original 8-bit value may be converted into a 30-bit ramp/thermometer value. Accordingly, the bandwidth (e.g., interfaces) as well as buffers/memory, may need to accommodate 30-bit values rather than 8-bit values. When considering RGB values (e.g., an 8-bit value for each of red, green, and blue), the requirement may accordingly increase to 90 bits per pixel (e.g., 30×3). In some examples, it may not be feasible for display driver 120 and/or display panel 130 to convert values into thermometer codes or otherwise transmit and/or buffer the thermometer codes.

Figure 5A:
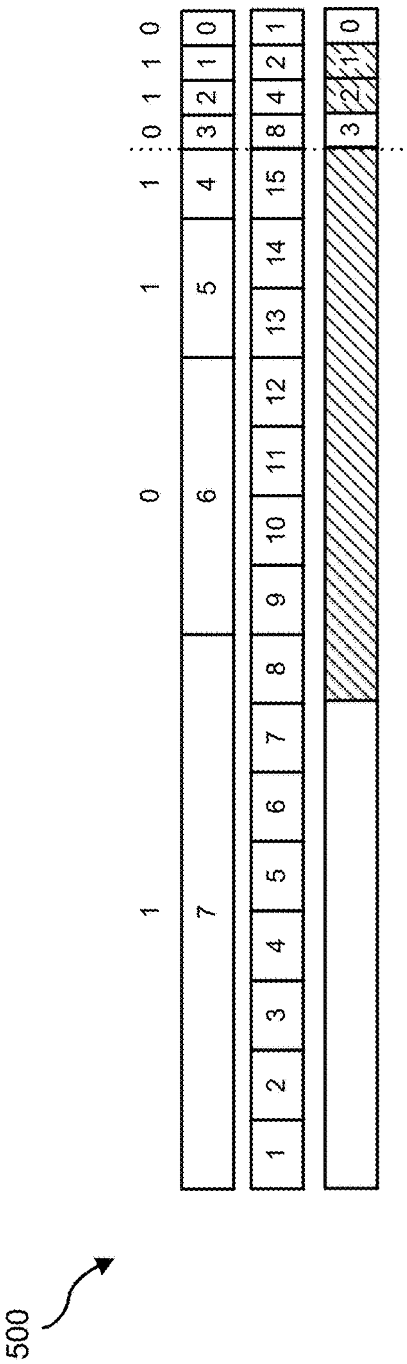
FIGS. 5A-B illustrate hybrid ramp driving schemes.
Figure 5B:
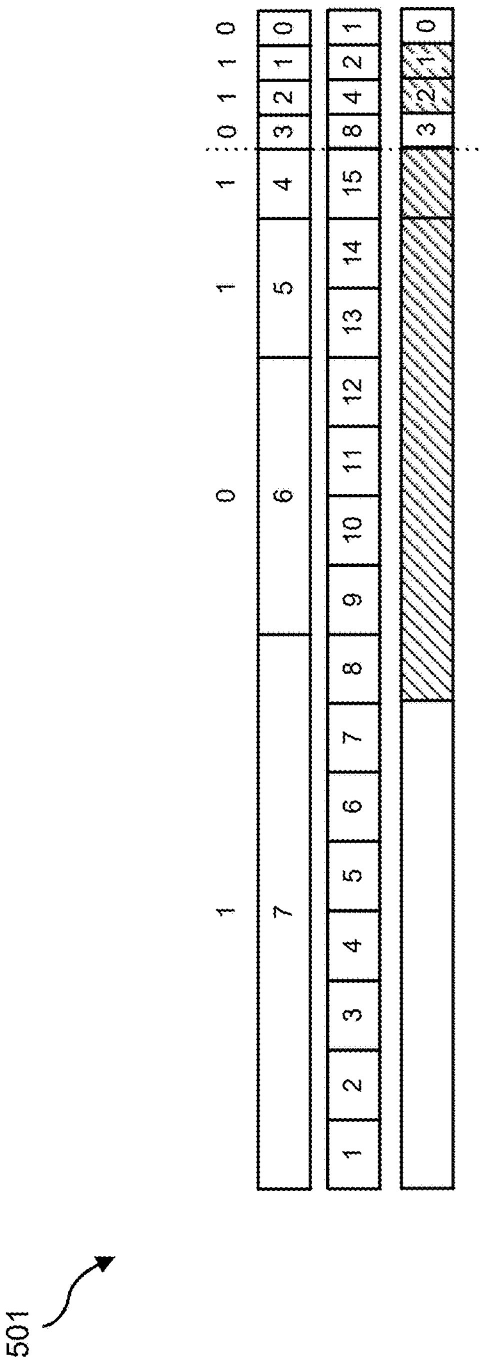

FIGS. 5A and 5B illustrate examples of modified ramping schemes corresponding to a hybrid of different schemes (e.g., ramp driving scheme and subframe scheme, although in other examples, other combinations of digital driving schemes may be used). A first portion (e.g., 4 MSBs) of a given pixel value may incorporate a first digital driving scheme and a second portion (e.g., 4 LSBs) of the given pixel value may incorporate a second digital driving scheme. Further, although the examples herein discuss two portions (e.g., splitting an 8-bit pixel value into 4 MSBs and 4 LSBs), in other examples, other divisions may be used, such as different bit widths of portions (e.g., 3 MSBs with 5 LSBs), a different number of portions (e.g., 3 portions such as 3 MSBs, 3 bits, 2 LSBs, etc.) with any combination of digital driving schemes applied to the different portions.

FIG. 5A illustrates a hybrid driving scheme 500 in which the 4 MSBs may be converted into a 15-bit thermometer code (e.g., 15-bit ramp) and the 4 LSBs may be converted into a subframe value. In some implementations, the subframe values may not be interleaved (e.g., as in FIG. 3B) such that each digital pixel bit may be converted to a 1-to-1 subframe value. Due to the shorter subframe durations, potential visual artifacts from non-contiguous pulses may be minimal or otherwise acceptable. Further, a number of subframes represented by the 4 LSBs may be less than that of the 4 MSBs, as will be described further with respect to FIG. 6A.

FIG. 6A illustrates a table 600 representing hybrid driving scheme 500 for converting binary values into thermometer and subframe values, with a "1" representing "on," and empty space (e.g., "0" being omitted) corresponding to "off." Each 4-bit digital pixel value may be converted into the corresponding thermometer value or subframe value such that the 4 MSBs may be converted into the appropriate thermometer value, and the 4 LSBs may be converted into the appropriate subframe value. For example, returning to the "10110110" value example, the 4 MSBs ("1011") may be converted into "000011111111111" and the 4 LSBs ("0110") may be converted to "0110." As illustrated, the subframe values may be equivalent to the binary values such that the subframe conversion may not be an active conversion but rather retaining the same bits. As further illustrated in FIG. 6A, an 8-bit pixel value may accordingly be converted into a 19-bit converted pixel value (e.g., 15 bits for the thermometer value and 4 bits for the subframe value). When applied to RGB values, 57 bits per pixel may allow for reduced memory/bandwidth requirements as compared to the 90 bits per pixel needed for the full ramp driving scheme.

In some implementations, each converted bit may correspond to an equal or substantially equal subframe with respect to pulse width. For instance, in FIG. 6A, the full frame duration may be divided into substantially equal 19 subframes (e.g., for the 19 bits), although in other implementations, other subframe sizes may be used, including unequal sizes.

In some examples, further reduction of bits per pixel may be achieved without sacrificing acceptable performance with regards to mitigating visual artifacts. Turning to FIG. 5B, FIG. 5B illustrates a hybrid driving scheme 501. In FIG. 5B, the 4 MSBs may be converted using a modified ramp driving scheme, in which the 3 MSBs may be converted into a thermometer code, and the remaining bit retained (e.g., "1" being "on" and "0" being "off"). The 4 LSBs may be converted using the subframe driving scheme as described herein (e.g., retaining the bits rather than actively converted). In other examples, hybrid driving scheme 501 may correspond to the 3 MSBs converted using a ramp driving scheme (e.g., 7 bit) and 5 LSBs converted using a subframe driving scheme as described herein.

FIG. 6B illustrates a table 601 representing hybrid driving scheme 501 for converting binary values into thermometer and subframe values, with a "1" representing "on," and empty space (e.g., "0" being omitted) corresponding to "off," similar to table 600. Each 4-bit digital pixel value may be converted into the corresponding thermometer value or subframe value such that the 4 MSBs may be converted into the appropriate modified thermometer value (e.g., 7-bit value with 1 retained bit), and the 4 LSBs may be converted into the appropriate subframe value. In some implementations, each converted bit may correspond to one or more subframe (e.g., of substantially equal or unequal size) with respect to pulse width. For instance, in FIG. 6B, the full frame duration may be divided into 19 substantially equal subframes (similar to FIG. 6A), with certain converted bit values representing more than one subframe. As illustrated in FIG. 6B, the thermometer code bits may each represent two subframes.

For example, returning to the "10110110" value example, the 4 MSBs ("1011") may be converted into "00111111" but represent subframes as "000011111111111" and the 4 LSBs ("0110") may be converted to "0110." Accordingly, an 8-bit pixel value may be converted into a 12-bit converted pixel value (e.g., 8 bits for the modified thermometer value and 4 bits for the subframe value or alternatively 7 bits for the thermometer value and 5 bits for the subframe value). When applied to RGB values, 36 bits per pixel may allow for reduced memory/bandwidth requirements as compared to the 90 bits per pixel needed for the full ramp driving scheme.

In some implementations, the hybrid driving schemes described herein may allow reducing a buffer (e.g., frame or line buffer) size. As described above, the converted bit values may represent subframes. Moreover, the subframes may represent sequential/serial subframes. For example, in FIG. 6A or 6B, the consecutive bits of the converted value may also represent the sequence of subframes. In other words, the bits are ordered (e.g., 1-19 in FIG. 6A and 1-12 in FIG. 6B) such that following the order of bits corresponds to the "on/off" pulses for a given pixel. Accordingly, each pixel's converted value may be sent serially bit-by-bit, such that a received bit may activate/deactivate the respective pixel, which may allow a reduced size buffer as well as bandwidth requirement (e.g., by sending converted pixel data for a given pixel bit-by-bit rather than as a complete value).

Figure 7:
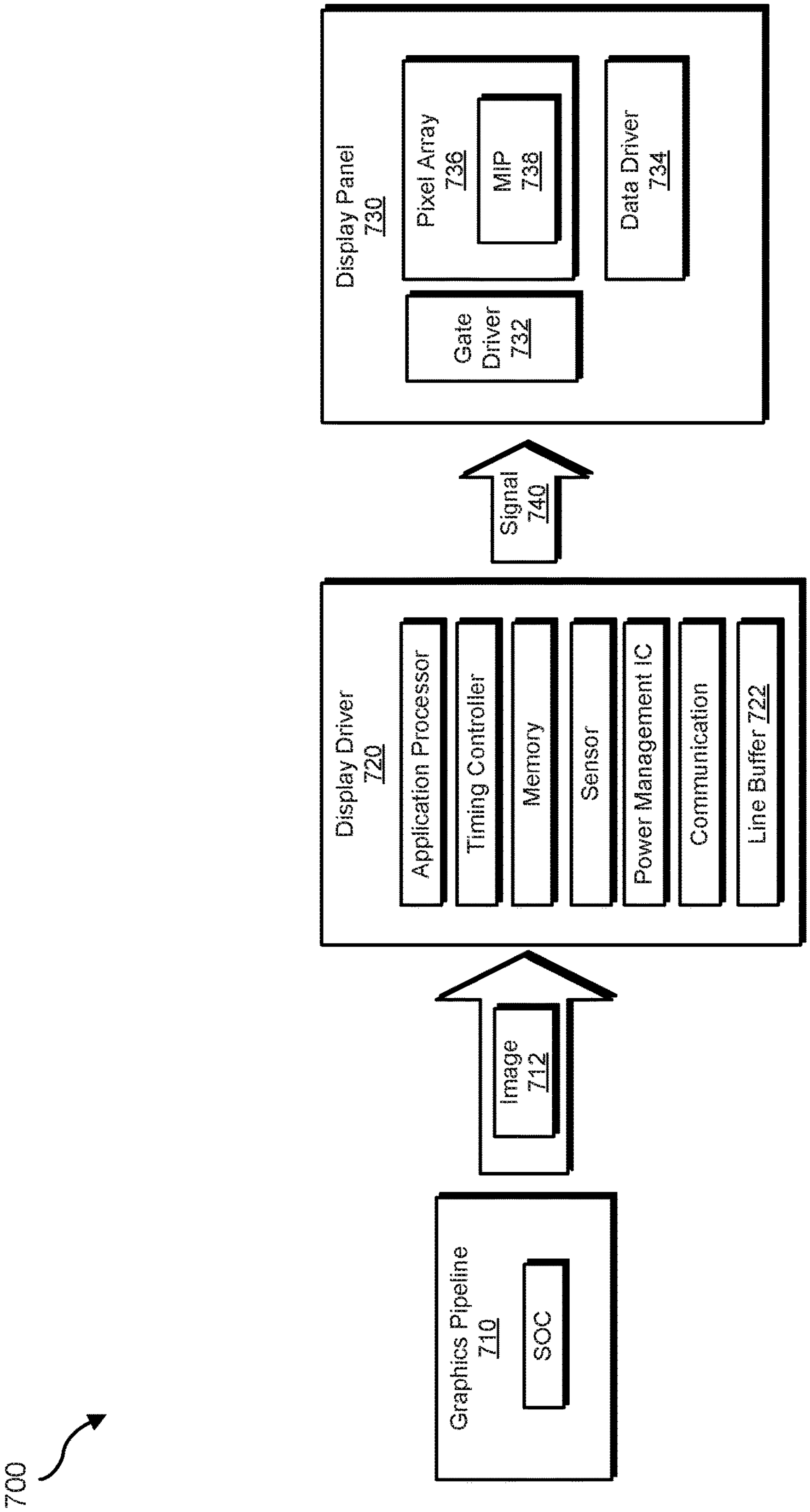
FIG. 7 illustrates an example architecture for the hybrid ramp driving schemes.

FIG. 7 illustrates a system 700 (corresponding to system 100) that may use one of the digital driving schemes described herein (e.g., the hybrid ramp driving scheme of FIGS. 5A and 6A and/or the modified hybrid ramp driving scheme of FIGS. 5B and 6B). FIG. 7 includes a graphics pipeline 710 (corresponding to graphics pipeline 110), an image 712 (corresponding to image 112), a display driver 720 (corresponding to display driver 120), a signal 740 (corresponding to signal 140), display panel 730 (corresponding to display panel 130), a gate driver 732 (corresponding to gate driver 132), a data driver 734 (corresponding to data driver 134), and a pixel array 736 (corresponding to pixel array 136).

In some implementations, display driver 720 may include a line buffer 722 which may correspond to a first-in-first-out (FIFO) line buffer. As size of line buffer 722 may correspond to a number of pixels per line (which in some examples may be multiplied by a factor representing a number of sub-pixels per pixel, such as 3 for RGB). In other words, line buffer 722 may be sized to hold 1 bit per pixel for a line. Graphics pipeline 710 may convert each pixel of a frame's image data using a digital driving scheme as described above. Graphics pipeline 710 may send image 712 line-by-line and bit-by-bit. For example, starting with the first line of a frame, graphics pipeline 710 may send the first bit value (e.g., the first bit of the converted pixel value) for each pixel in the first line. On a next cycle, graphics pipeline 710 may send the second bit value for each pixel in the first line, and so forth until all bit values for the first line have been sent, and continuing to the second line.

In an alternative implementation, graphics pipeline 710 may send the first bit value for the first line, and on the next cycle send the first bit value for the second line, and so forth until all the first bit values have been sent. Graphics pipeline 710 may then send the second bit value for the first line, and on the next cycle send the second bit value for the second line, and so forth.

Display driver 720 may accordingly buffer each line's bit values in line buffer 722, and send, as signal 740, the line to display panel 730. Each pixel of pixel array 736 may include an MIP 738 (corresponding to an MIP circuit) such that each corresponding pixel of the corresponding line of the received line of bit values may hold the bit for appropriately activating the pixel.

In yet another alternative implementation, display driver 720 may receive the pixel value data from graphics pipeline 710 and convert the pixel values using one of the digital driving schemes as described above. Display driver 720 may similarly provide bit-by-bit, line-by-line data to display panel 730 as described above.

A framebuffer may consume dynamic and static power which may affect system usage time and present thermal issues, particularly for AR/VR display systems having particular power/thermal requirements. In addition, a frame buffer may cause a latency from display input to output. Therefore, use of framebuffer may present a big risk for AR/VR display systems. Accordingly, a digital driving method as described herein may allow a framebuffer-less architecture, as in FIG. 7.

An AR/VR microdisplay (e.g., an on-silicon display such as OLED, μLED, LCoS) may have a framebuffer-less architecture for low latency. For example, a 1 bit memory-in-pixel may provide a high PPI backplane. The architecture may further include a digital architecture.

Additionally, using ramp driving for a most significant bit (MSB) may reduce image artifacts. Using subframe driving for a least significant bit (LSB) may reduce data bandwidth, as described above. In addition, in some examples, reducing 15-ramp to 7-ramp may also reduce data bandwidth (e.g., FIGS. 5B and 6B), although in other examples, other sizes may be used.

Figure 8:
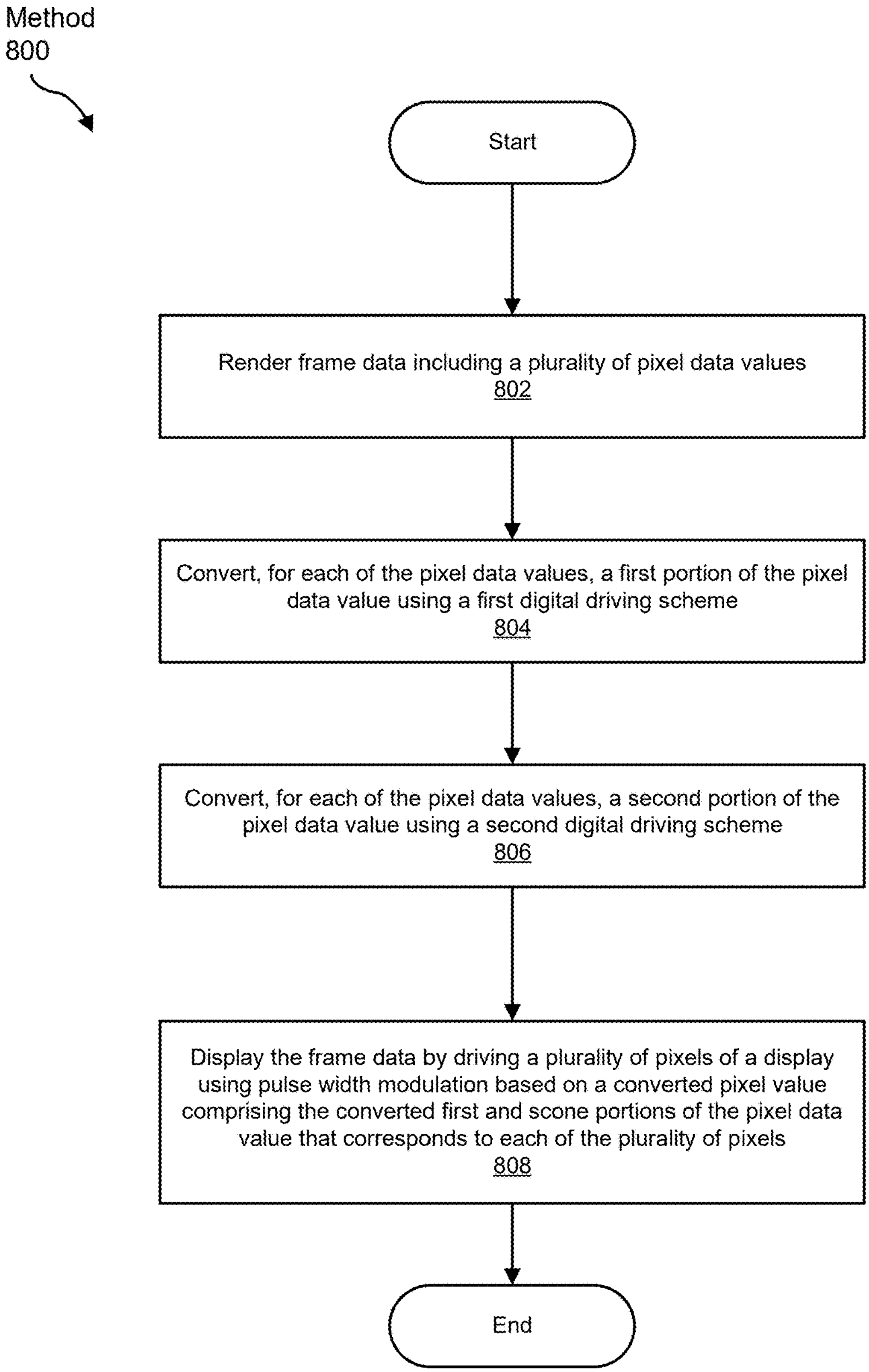
FIG. 8 is a flow diagram of an example method for digital driving on microdisplays.

FIG. 8 is a flow diagram of an exemplary computer-implemented method 800 for digital driving on microdisplays. The steps shown in FIG. 8 may be performed by any suitable computer-executable code and/or computing system, including the system(s) illustrated in FIGS. 1, 7, and/or 17 (described further below). In one example, each of the steps shown in FIG. 8 may represent an algorithm whose structure includes and/or is represented by multiple sub-steps, examples of which will be provided in greater detail below.

As illustrated in FIG. 8, at step 802 one or more of the systems described herein may render frame data including a plurality of pixel data values. For example, graphics pipeline 710 may render pixel data values for each pixel (e.g., sub-pixels such as for RGB) for a given frame to be displayed.

At step 804 one or more of the systems described herein may convert, for each of the pixel data values, a first portion of the pixel data value using a first digital driving scheme. For example, graphics pipeline 710 and/or display driver 720 may convert each pixel value using one of the hybrid digital driving schemes described herein.

The systems described herein may perform step 804 in a variety of ways. In one example, the first digital driving scheme corresponds to a ramp driving scheme converting discrete non-uniform pulses represented by bits into a continuous pulse represented by additional bits, as described herein (e.g., with respect to FIGS. 5A and 6A). In another example, the first digital driving scheme corresponds to a modified ramp driving scheme converting discrete non-uniform pulses represented by bits into a continuous pulse represented by additional bits and at least one separate discrete pulse, as described herein (e.g., with respect to FIGS. 5B and 6B). In some examples, the first portion corresponds to upper bits (e.g., MSBs) of the pixel data value as described herein.

At step 806 one or more of the systems described herein may convert, for each of the pixel data values, a second portion of the pixel data value using a second digital driving scheme. For example, graphics pipeline 710 and/or display driver 720 may convert each pixel value using one of the hybrid digital driving schemes described herein.

The systems described herein may perform step 806 in a variety of ways. In one example, the second digital driving scheme corresponds to a subframe scheme converting discrete non-uniform pulses represented by bits into interleaved uniform pulses represented by rearranged bits, as described herein (e.g., with respect to FIGS. 5A and 6A, and 5B and 6B). In some examples, the second portion corresponds to lower bits (e.g., LSBs) of the pixel data value, as described herein.

At step 808 one or more of the systems described herein may display the frame data by driving a plurality of pixels of a display using pulse width modulation based on a converted pixel value comprising the converted first and second portions of the pixel data value that corresponds to each of the plurality of pixels. For example, display panel 730 may drive pixel array 736 (using gate driver 732 and data driver 734) using the converted pixel value (e.g., a given bit thereof) that may be stored in MIP 738 (for each pixel).

The systems described herein may perform step 808 in a variety of ways. In one example, this step may include buffering the line of converted pixel values in a line buffer (e.g., line buffer 722), and driving a line of pixels using the converted pixel values in the line buffer. In some examples, this step may further include buffering, in the line buffer, bit values of a first bit index from each of the converted pixel values for a first line of the frame data. In some examples, this step may further include buffering, in the line buffer, bit values of the first bit index from each of the converted pixel values for a second line of the frame data after driving a first line of pixels based on the first bit index. In some examples, this step may further include buffering, in the line buffer, bit values of a second bit index from each of the converted pixel values for the first line of the frame data after driving the second line of pixels based on the first bit index.

In other words, the first bit of each of the converted pixel values for a first line may be buffered in the line buffer. After driving the corresponding line of pixels based on the first bit (e.g., "1" is on, "0" is off), the process may continue with the next line (e.g., buffering the first bit of each of the corresponding converted pixel values for the next line), and so forth until the last line. Next, the second bit of each of the converted pixel values for the first line may be buffered, and so forth. In this way each successive bit for the converted pixel values may be buffered, and used to drive pixels (line by line) until the whole frame is completed.

As detailed above, digital driving (e.g., pulse width modulation) of microdisplays may exhibit undesirable visual artifacts. From a visual artifact aspect, having a high frame per second (FPS) full color display with analog driving such as μOLED may exhibit little or no saccadic artifacts, and a high FPS low persistence driving may reduce the VOR judder noise and motion to photon latency. However, increasing FPS may induce higher power consumption not only in the display, but also in computation, graphics pipeline and data interface. Accordingly, increasing FPS may not be a feasible solution for XR systems with tight power and thermal budgets. Also, decreasing display persistence may cause side effects such as flicker and image discontinuity. In addition, the shorter emission time may cause another side effect in the emission device. For example, if light emitting device (e.g. LED or OLED) drives with 10% of persistence, the peak luminance of device should be ten times brighter. The higher peak brightness may bring higher risk of shorter lifetime and/or lower efficiency. For these reasons, a high FPS and low persistence display may not a feasible solution for AR/VR display systems.

Previous digital driving research may address saccadic artifacts of DFC and CBU. However, there was no clear benefit in compensating head motion for VOR or latency compared to the analog driving. Rather, digital driving may exacerbate the side effect of low persistence display due to its PWM driving feature. Therefore, an intraframe time warp (ITW), a visual artifact compensation solution for digital driving displays, is described herein with various examples. Certain aspects may include continuously updating the warp information to achieve effectively 500 Hz update and reduce the latency under the human perception level. In addition to the reducing the latency, ITW may compensate motion blurs due to the head motion exploiting the high speed.

As digital driving may have higher frequency to build a same frame rate of image, ITW may exploit the subframes to compensate for head motion. For example, 90 Hz FPS display with 20 subframes updating display with 1800 Hz operating frequency. If each subframe updates a warping information, ITW may achieve an effective 1800 Hz update with 0.55 milliseconds latency, in some examples. Accordingly, ITW may compensate for visual artifacts from head motion like VOR judder, motion blur, and motion to photon latency at the same time Digital driving may be advantageous in small pixel pitch and low power consumption applications and accordingly an optimum driving architecture on the silicon backplane, as described herein. A digital driving μOLED may be advantageous in power consumption, simple peripheral circuitry, and higher operation frequency. Another significant advantage of digital driving may be the higher operation frequency. ITW may exploit the higher speed of digital driving to compensate visual artifacts from the head motion. While the analog driving may have a limited mitigation method of low persistence driving, digital driving may reduce the artifacts counter acts to the root casing head motion.

Further, as detailed above, a sub-frame driving scheme may distribute the weight of MSB over the frame time. Another scheme is digital ramp driving, which may use a ramp signal and comparator to generate one continuous PWM signal. The ramp PWM may mitigate the visual artifacts due to its linearity. To reduce a required bandwidth for the ramp PWM, a hybrid approach as described above may implemented. In some implementations, a reduced buffer size may be used (e.g., rather than a frame buffer for a full frame, a line buffer and in some examples, a 1-bit line buffer may be used as described herein).

EXAMPLE EMBODIMENTS

Example 1. A method comprising: rendering frame data including a plurality of pixel data values; converting, for each of the pixel data values, a first portion of the pixel data value using a first digital driving scheme; converting, for each of the pixel data values, a second portion of the pixel data value using a second digital driving scheme; and displaying the frame data by driving a plurality of pixels of a display using pulse width modulation based on a converted pixel value comprising the converted first and second portions of the pixel data value that corresponds to each of the plurality of pixels.

Example 2. The method of Example 1, wherein the first digital driving scheme corresponds to a ramp driving scheme converting discrete non-uniform pulses represented by bits into a continuous pulse represented by additional bits.

Example 3. The method of any of Examples 1-2, wherein the first digital driving scheme corresponds to a modified ramp driving scheme converting discrete non-uniform pulses represented by bits into a continuous pulse represented by additional bits and at least one separate discrete pulse.

Example 4. The method of any of Examples 1-3, wherein the second digital driving scheme corresponds to a subframe scheme converting discrete non-uniform pulses represented by bits into interleaved uniform pulses represented by rearranged bits.

Example 5. The method of any of Examples 1-4, wherein the first portion corresponds to upper bits of the pixel data value and the second portion corresponds to lower bits of the pixel data value.

Example 6. The method of any of Examples 1-5, further comprising: buffering a line of converted pixel values in a line buffer; and driving a line of pixels using the converted pixel values in the line buffer.

Example 7. The method of any of Examples 1-6, further comprising buffering, in the line buffer, bit values of a first bit index from each of the converted pixel values for a first line of the frame data.

Example 8. The method of Example 7, further comprising buffering, in the line buffer, bit values of the first bit index from each of the converted pixel values for a second line of the frame data after driving a first line of pixels based on the first bit index.

Example 9. The method of Example 7 or 8, further comprising buffering, in the line buffer, bit values of a second bit index from each of the converted pixel values for the first line of the frame data after driving the second line of pixels based on the first bit index.

Example 10. A system comprising: at least one physical processor; physical memory comprising computer-executable instructions that, when executed by the physical processor, cause the physical processor to: render frame data including a plurality of pixel data values; convert, for each of the pixel data values, a first portion of the pixel data value using a first digital driving scheme; convert, for each of the pixel data values, a second portion of the pixel data value using a second digital driving scheme; and a display configured to display the frame data by driving a plurality of pixels of the display using pulse width modulation based on a converted pixel value comprising the converted first and second portions of the pixel data value that corresponds to each of the plurality of pixels.

Example 11. The system of Example 10, wherein the first digital driving scheme corresponds to a ramp driving scheme converting discrete non-uniform pulses represented by bits into a continuous pulse represented by additional bits.

Example 12. The system of any of Examples 10-11, wherein the first digital driving scheme corresponds to a modified ramp driving scheme converting discrete non-uniform pulses represented by bits into a continuous pulse represented by additional bits and at least one separate discrete pulse.

Example 13. The system of any of Examples 10-12, wherein the second digital driving scheme corresponds to a subframe scheme converting discrete non-uniform pulses represented by bits into interleaved uniform pulses represented by rearranged bits.

Example 14. The system of any of Examples 10-13, wherein the first portion corresponds to upper bits of the pixel data value and the second portion corresponds to lower bits of the pixel data value.

Example 15. The system of any of Examples 10-14, wherein the instructions further cause the physical processor to: buffer a line of converted pixel values in a line buffer; and drive a line of pixels using the converted pixel values in the line buffer.

Example 16. The system of any of Examples 10-15, wherein the instructions further cause the physical processor to: buffer, in a line buffer, bit values of a first bit index from each of the converted pixel values for a first line of the frame data; driving a first line of pixels based on the first bit index; buffering, in the line buffer, bit values of the first bit index from each of the converted pixel values for a second line of the frame data after driving the first line of pixels based on the first bit index; driving the second line of pixels based on the first bit index; and buffering, in the line buffer, bit values of a second bit index from each of the converted pixel values for the first line of the frame data after driving the second line of pixels based on the first bit index.

Example 17. A non-transitory computer-readable medium comprising one or more computer-executable instructions that, when executed by at least one processor of a computing device, cause the computing device to: render frame data including a plurality of pixel data values; convert, for each of the pixel data values, a first portion of the pixel data value using a first digital driving scheme; convert, for each of the pixel data values, a second portion of the pixel data value using a second digital driving scheme; and display the frame data by driving a plurality of pixels of a display using pulse width modulation based on a converted pixel value comprising the converted first and second portions of the pixel data value that corresponds to each of the plurality of pixels.

Example 18. The non-transitory computer-readable medium of Example 17, wherein: the first digital driving scheme corresponds to a ramp driving scheme converting discrete non-uniform pulses represented by bits into a continuous pulse represented by additional bits; and the second digital driving scheme corresponds to a subframe scheme converting discrete non-uniform pulses represented by bits into interleaved uniform pulses represented by rearranged bits.

Example 19. The non-transitory computer-readable medium of any of Examples 17-18, wherein the first portion corresponds to upper bits of the pixel data value and the second portion corresponds to lower bits of the pixel data value.

Example 20. The non-transitory computer-readable medium of any of Examples 17-19, wherein the instructions further cause the computing device to: buffer, in a line buffer, bit values of a first bit index from each of the converted pixel values for a first line of the frame data; drive a first line of pixels based on the first bit index; buffer, in the line buffer, bit values of the first bit index from each of the converted pixel values for a second line of the frame data after driving the first line of pixels based on the first bit index; drive the second line of pixels based on the first bit index; and buffer, in the line buffer, bit values of a second bit index from each of the converted pixel values for the first line of the frame data after driving the second line of pixels based on the first bit index.

Embodiments of the present disclosure may include or be implemented in conjunction with various types of Artificial-Reality (AR) systems. AR may be any superimposed functionality and/or sensory-detectable content presented by an artificial-reality system within a user's physical surroundings. In other words, AR is a form of reality that has been adjusted in some manner before presentation to a user. AR can include and/or represent virtual reality (VR), augmented reality, mixed AR (MAR), or some combination and/or variation of these types of realities. Similarly, AR environments may include VR environments (including non-immersive, semi-immersive, and fully immersive VR environments), augmented-reality environments (including marker-based augmented-reality environments, markerless augmented-reality environments, location-based augmented-reality environments, and projection-based augmented-reality environments), hybrid-reality environments, and/or any other type or form of mixed- or alternative-reality environments.

AR content may include completely computer-generated content or computer-generated content combined with captured (e.g., real-world) content. Such AR content may include video, audio, haptic feedback, or some combination thereof, any of which may be presented in a single channel or in multiple channels (such as stereo video that produces a three-dimensional (3D) effect to the viewer). Additionally, in some embodiments, AR may also be associated with applications, products, accessories, services, or some combination thereof, that are used to, for example, create content in an artificial reality and/or are otherwise used in (e.g., to perform activities in) an artificial reality.

AR systems may be implemented in a variety of different form factors and configurations. Some AR systems may be designed to work without near-eye displays (NEDs). Other AR systems may include a NED that also provides visibility into the real world (such as, e.g., augmented-reality system 1500 in FIG. 15) or that visually immerses a user in an artificial reality (such as, e.g., virtual-reality system 1600 in FIGS. 16A and 16B). While some AR devices may be self-contained systems, other AR devices may communicate and/or coordinate with external devices to provide an AR experience to a user. Examples of such external devices include handheld controllers, mobile devices, desktop computers, devices worn by a user, devices worn by one or more other users, and/or any other suitable external system.

Figure 9:
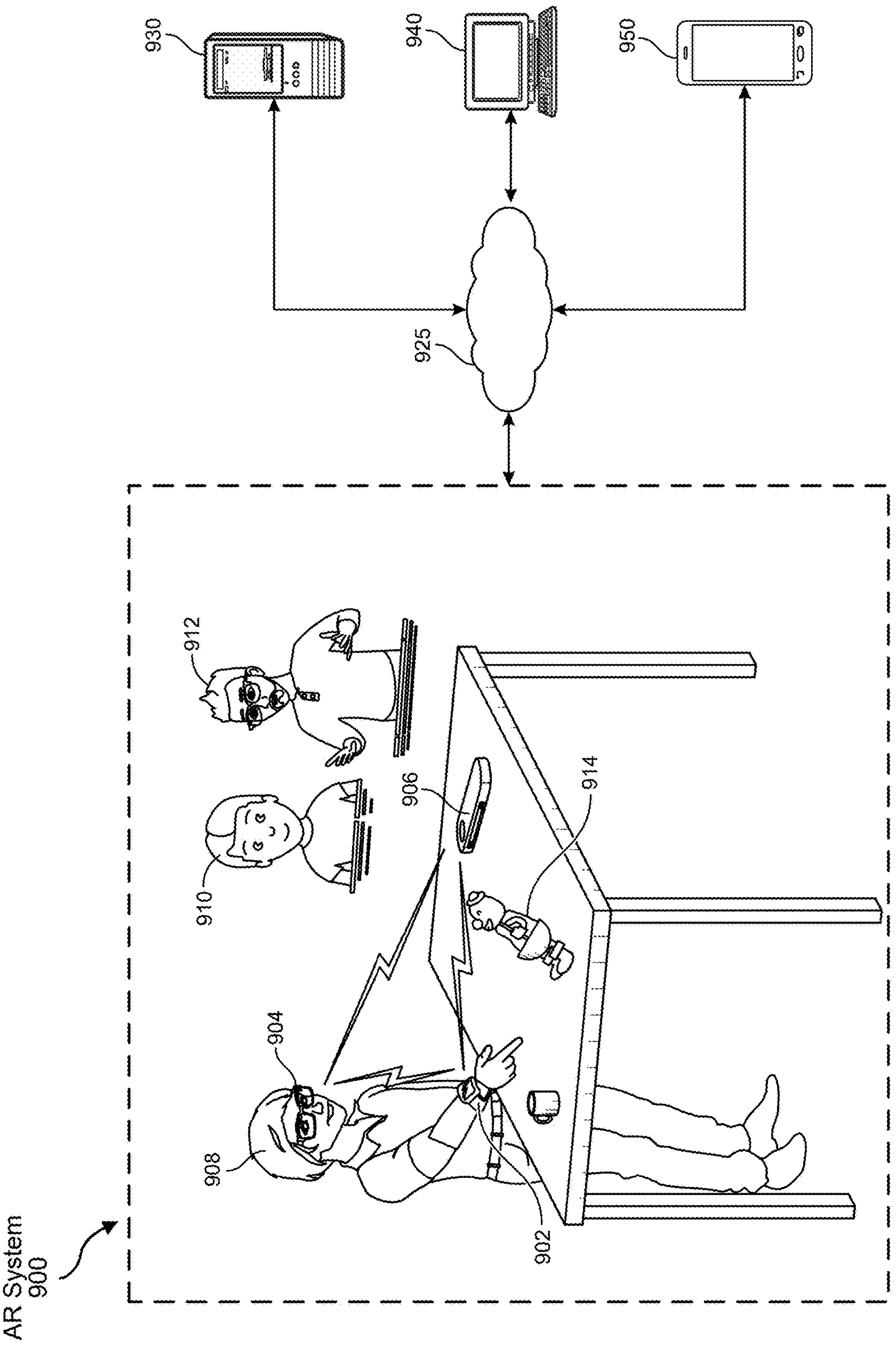
FIG. 9 is an illustration of an example artificial-reality system according to some embodiments of this disclosure.
Figure 10:
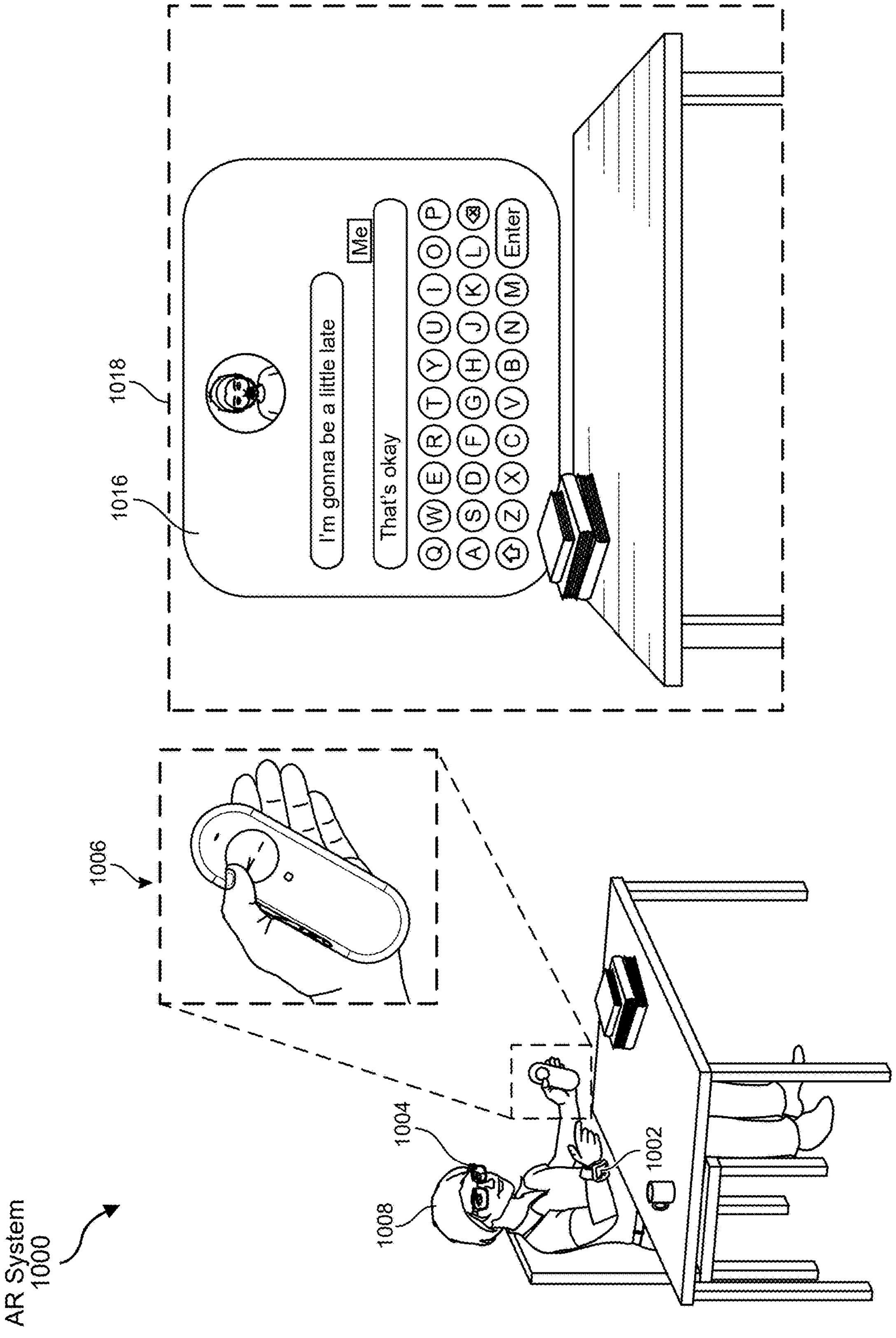
FIG. 10 is an illustration of an example artificial-reality system with a handheld device according to some embodiments of this disclosure.
Figure 11A:
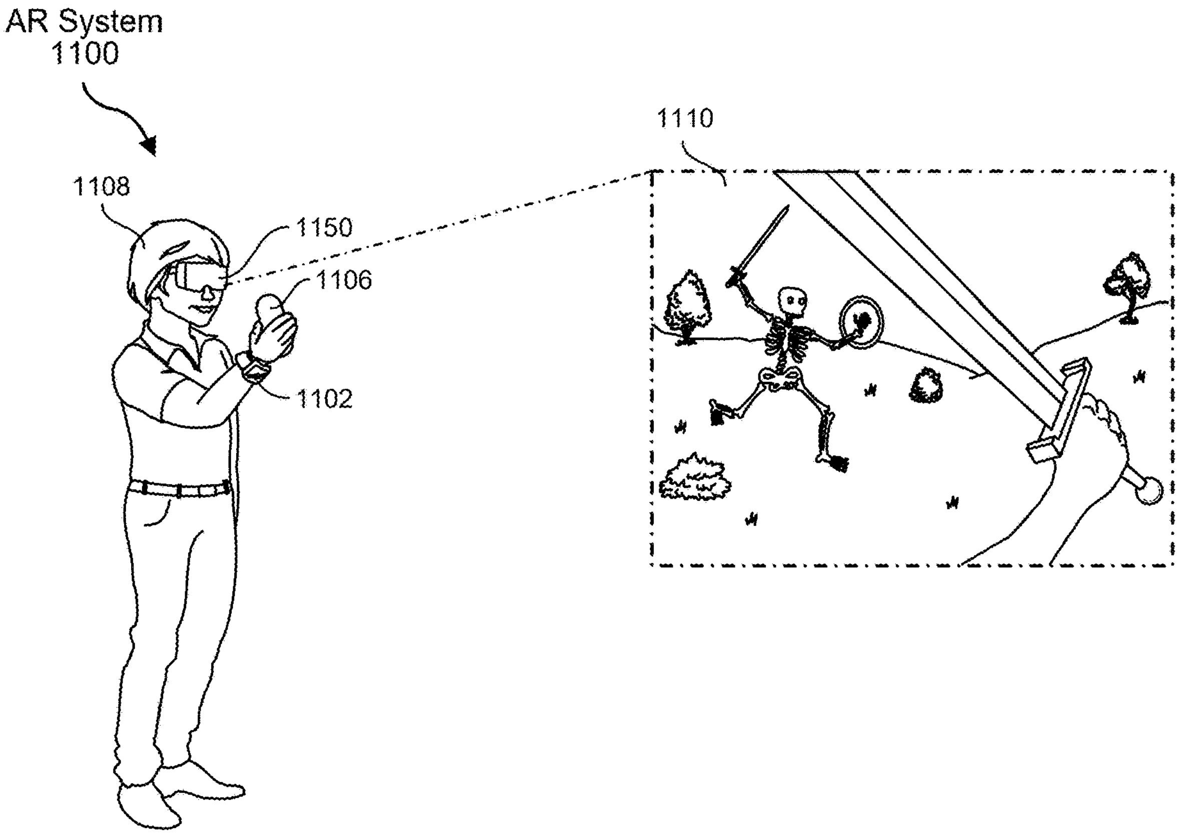
FIG. 11A is an illustration of example user interactions within an artificial-reality system according to some embodiments of this disclosure.
Figure 11B:
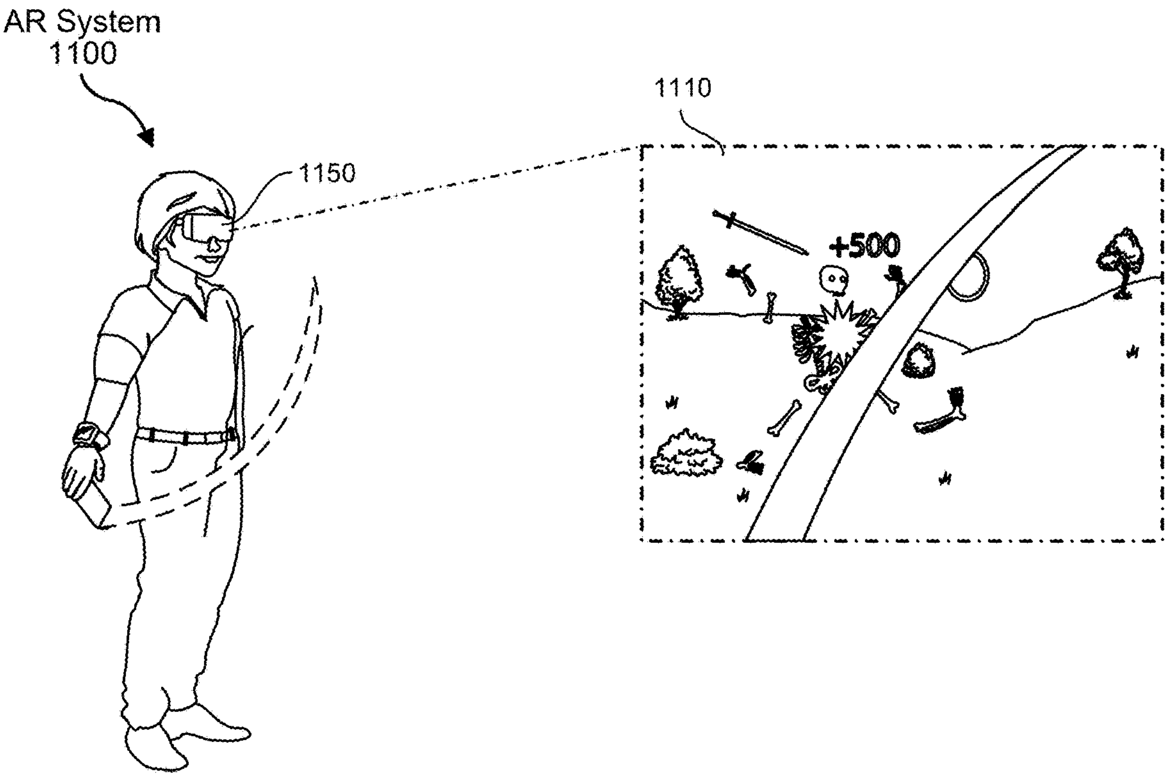
FIG. 11B is an illustration of example user interactions within an artificial-reality system according to some embodiments of this disclosure.
Figure 12A:
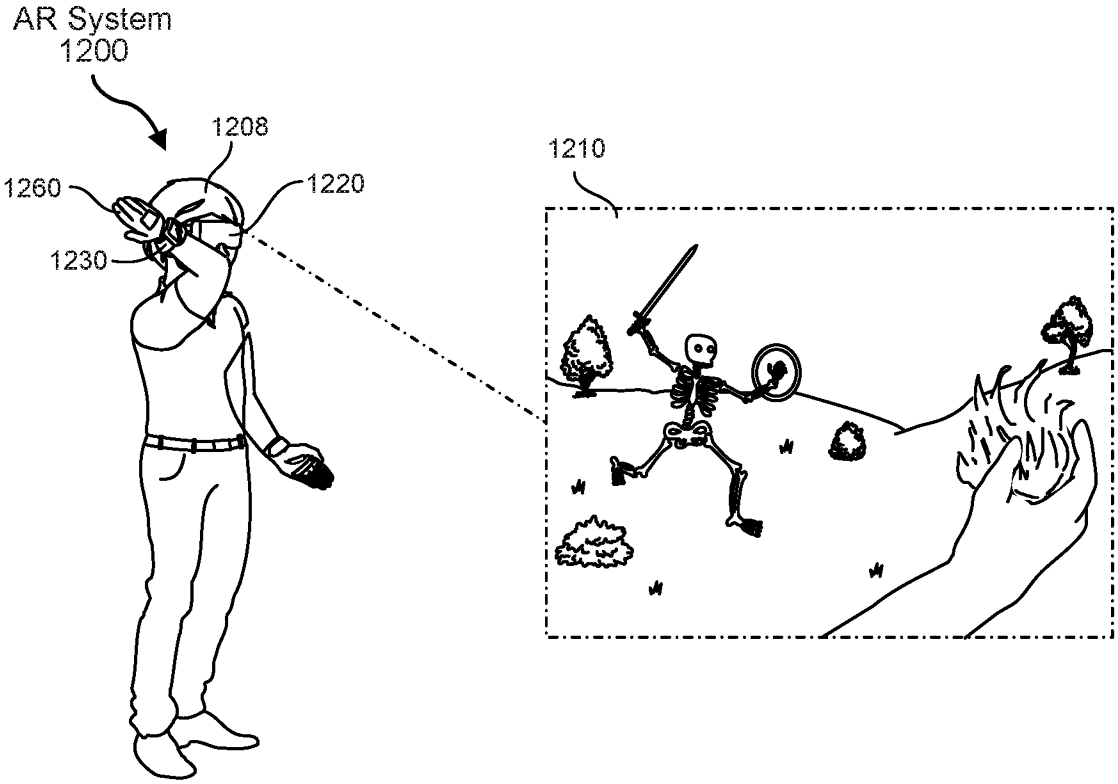
FIG. 12A is an illustration of example user interactions within an artificial-reality system according to some embodiments of this disclosure.
Figure 12B:
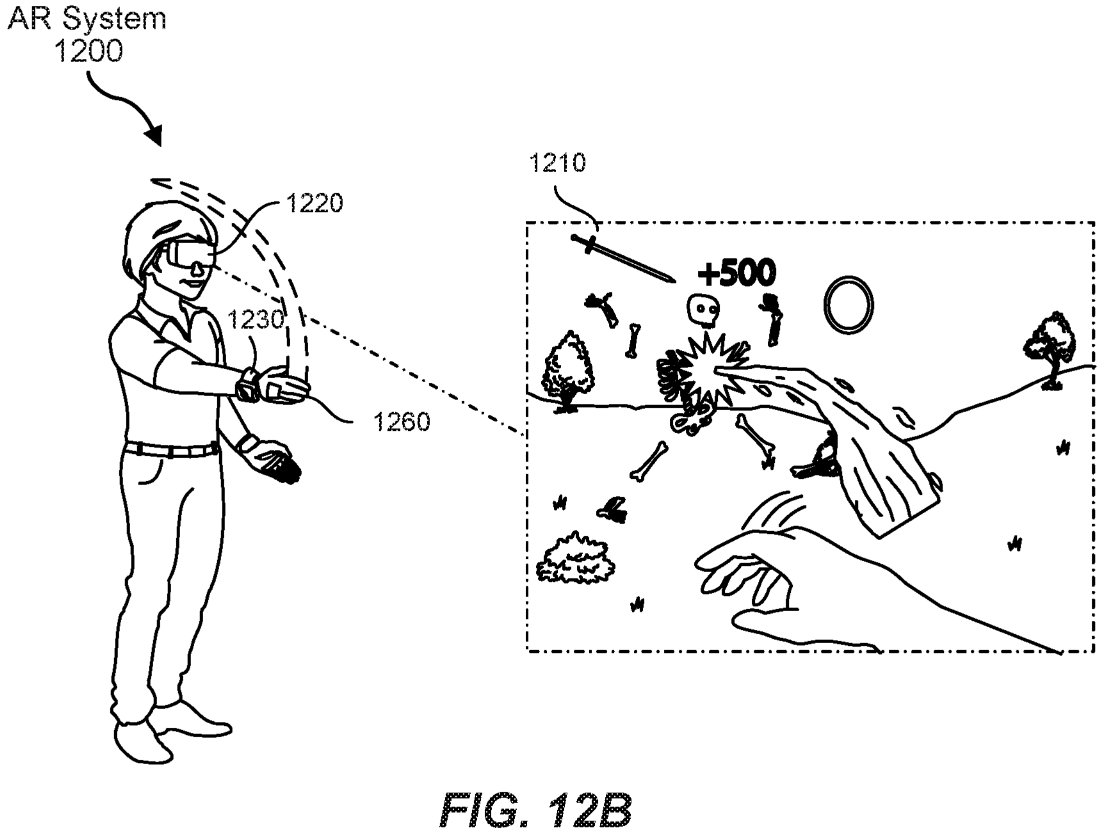
FIG. 12B is an illustration of example user interactions within an artificial-reality system according to some embodiments of this disclosure.

FIGS. 9-12B illustrate example artificial-reality (AR) systems in accordance with some embodiments. FIG. 9 shows a first AR system 900 and first example user interactions using a wrist-wearable device 902, a head-wearable device (e.g., AR glasses 1500), and/or a handheld intermediary processing device (HIPD) 906. FIG. 10 shows a second AR system 1000 and second example user interactions using a wrist-wearable device 1002, AR glasses 1004, and/or an HIPD 1006. FIGS. 11A and 11B show a third AR system 1100 and third example user 1108 interactions using a wrist-wearable device 1102, a head-wearable device (e.g., VR headset 1150), and/or an HIPD 1106. FIGS. 12A and 12B show a fourth AR system 1200 and fourth example user 1208 interactions using a wrist-wearable device 1230, VR headset 1220, and/or a haptic device 1260 (e.g., wearable gloves).

A wrist-wearable device 1300, which can be used for wrist-wearable device 902, 1002, 1102, 1230, and one or more of its components, are described below in reference to FIGS. 13 and 14; head-wearable devices 1500 and 1600, which can respectively be used for AR glasses 904, 1004 or VR headset 1150, 1220, and their one or more components are described below in reference to FIGS. 15-17.

Referring to FIG. 9, wrist-wearable device 902, AR glasses 904, and/or HIPD 906 can communicatively couple via a network 925 (e.g., cellular, near field, Wi-Fi, personal area network, wireless LAN, etc.). Additionally, wrist-wearable device 902, AR glasses 904, and/or HIPD 906 can also communicatively couple with one or more servers 930, computers 940 (e.g., laptops, computers, etc.), mobile devices 950 (e.g., smartphones, tablets, etc.), and/or other electronic devices via network 925 (e.g., cellular, near field, Wi-Fi, personal area network, wireless LAN, etc.).

In FIG. 9, a user 908 is shown wearing wrist-wearable device 902 and AR glasses 904 and having HIPD 906 on their desk. The wrist-wearable device 902, AR glasses 904, and HIPD 906 facilitate user interaction with an AR environment. In particular, as shown by first AR system 900, wrist-wearable device 902, AR glasses 904, and/or HIPD 906 cause presentation of one or more avatars 910, digital representations of contacts 912, and virtual objects 914. As discussed below, user 908 can interact with one or more avatars 910, digital representations of contacts 912, and virtual objects 914 via wrist-wearable device 902, AR glasses 904, and/or HIPD 906.

User 908 can use any of wrist-wearable device 902, AR glasses 904, and/or HIPD 906 to provide user inputs. For example, user 908 can perform one or more hand gestures that are detected by wrist-wearable device 902 (e.g., using one or more EMG sensors and/or IMUs, described below in reference to FIGS. 13 and 14) and/or AR glasses 904 (e.g., using one or more image sensor or camera, described below in reference to FIGS. 15-10) to provide a user input. Alternatively, or additionally, user 908 can provide a user input via one or more touch surfaces of wrist-wearable device 902, AR glasses 904, HIPD 906, and/or voice commands captured by a microphone of wrist-wearable device 902, AR glasses 904, and/or HIPD 906. In some embodiments, wrist-wearable device 902, AR glasses 904, and/or HIPD 906 include a digital assistant to help user 908 in providing a user input (e.g., completing a sequence of operations, suggesting different operations or commands, providing reminders, confirming a command, etc.). In some embodiments, user 908 can provide a user input via one or more facial gestures and/or facial expressions. For example, cameras of wrist-wearable device 902, AR glasses 904, and/or HIPD 906 can track eyes of user 908 for navigating a user interface.

Wrist-wearable device 902, AR glasses 904, and/or HIPD 906 can operate alone or in conjunction to allow user 908 to interact with the AR environment. In some embodiments, HIPD 906 is configured to operate as a central hub or control center for the wrist-wearable device 902, AR glasses 904, and/or another communicatively coupled device. For example, user 908 can provide an input to interact with the AR environment at any of wrist-wearable device 902, AR glasses 904, and/or HIPD 906, and HIPD 906 can identify one or more back-end and front-end tasks to cause the performance of the requested interaction and distribute instructions to cause the performance of the one or more back-end and front-end tasks at wrist-wearable device 902, AR glasses 904, and/or HIPD 906. In some embodiments, a back-end task is a background processing task that is not perceptible by the user (e.g., rendering content, decompression, compression, etc.), and a front-end task is a user-facing task that is perceptible to the user (e.g., presenting information to the user, providing feedback to the user, etc.). As described below, HIPD 906 can perform the back-end tasks and provide wrist-wearable device 902 and/or AR glasses 904 operational data corresponding to the performed back-end tasks such that wrist-wearable device 902 and/or AR glasses 904 can perform the front-end tasks. In this way, HIPD 906, which has more computational resources and greater thermal headroom than wrist-wearable device 902 and/or AR glasses 904, performs computationally intensive tasks and reduces the computer resource utilization and/or power usage of wrist-wearable device 902 and/or AR glasses 904.

In the example shown by first AR system 900, HIPD 906 identifies one or more back-end tasks and front-end tasks associated with a user request to initiate an AR video call with one or more other users (represented by avatar 910 and the digital representation of contact 912) and distributes instructions to cause the performance of the one or more back-end tasks and front-end tasks. In particular, HIPD 906 performs back-end tasks for processing and/or rendering image data (and other data) associated with the AR video call and provides operational data associated with the performed back-end tasks to AR glasses 904 such that the AR glasses 904 perform front-end tasks for presenting the AR video call (e.g., presenting avatar 910 and digital representation of contact 912).

In some embodiments, HIPD 906 can operate as a focal or anchor point for causing the presentation of information. This allows user 908 to be generally aware of where information is presented. For example, as shown in first AR system 900, avatar 910 and the digital representation of contact 912 are presented above HIPD 906. In particular, HIPD 906 and AR glasses 904 operate in conjunction to determine a location for presenting avatar 910 and the digital representation of contact 912. In some embodiments, information can be presented a predetermined distance from HIPD 906 (e.g., within 5 meters). For example, as shown in first AR system 900, virtual object 914 is presented on the desk some distance from HIPD 906. Similar to the above example, HIPD 906 and AR glasses 904 can operate in conjunction to determine a location for presenting virtual object 914. Alternatively, in some embodiments, presentation of information is not bound by HIPD 906. More specifically, avatar 910, digital representation of contact 912, and virtual object 914 do not have to be presented within a predetermined distance of HIPD 906.

User inputs provided at wrist-wearable device 902, AR glasses 904, and/or HIPD 906 are coordinated such that the user can use any device to initiate, continue, and/or complete an operation. For example, user 908 can provide a user input to AR glasses 904 to cause AR glasses 904 to present virtual object 914 and, while virtual object 914 is presented by AR glasses 904, user 908 can provide one or more hand gestures via wrist-wearable device 902 to interact and/or manipulate virtual object 914.

FIG. 10 shows a user 1008 wearing a wrist-wearable device 1002 and AR glasses 1004, and holding an HIPD 1006. In second AR system 1000, the wrist-wearable device 1002, AR glasses 1004, and/or HIPD 1006 are used to receive and/or provide one or more messages to a contact of user 1008. In particular, wrist-wearable device 1002, AR glasses 1004, and/or HIPD 1006 detect and coordinate one or more user inputs to initiate a messaging application and prepare a response to a received message via the messaging application.

In some embodiments, user 1008 initiates, via a user input, an application on wrist-wearable device 1002, AR glasses 1004, and/or HIPD 1006 that causes the application to initiate on at least one device. For example, in second AR system 1000, user 1008 performs a hand gesture associated with a command for initiating a messaging application (represented by messaging user interface 1016), wrist-wearable device 1002 detects the hand gesture and, based on a determination that user 1008 is wearing AR glasses 1004, causes AR glasses 1004 to present a messaging user interface 1016 of the messaging application. AR glasses 1004 can present messaging user interface 1016 to user 1008 via its display (e.g., as shown by a field of view 1018 of user 1008). In some embodiments, the application is initiated and executed on the device (e.g., wrist-wearable device 1002, AR glasses 1004, and/or HIPD 1006) that detects the user input to initiate the application, and the device provides another device operational data to cause the presentation of the messaging application. For example, wrist-wearable device 1002 can detect the user input to initiate a messaging application, initiate and run the messaging application, and provide operational data to AR glasses 1004 and/or HIPD 1006 to cause presentation of the messaging application. Alternatively, the application can be initiated and executed at a device other than the device that detected the user input. For example, wrist-wearable device 1002 can detect the hand gesture associated with initiating the messaging application and cause HIPD 1006 to run the messaging application and coordinate the presentation of the messaging application.

Further, user 1008 can provide a user input provided at wrist-wearable device 1002, AR glasses 1004, and/or HIPD 1006 to continue and/or complete an operation initiated at another device. For example, after initiating the messaging application via wrist-wearable device 1002 and while AR glasses 1004 present messaging user interface 1016, user 1008 can provide an input at HIPD 1006 to prepare a response (e.g., shown by the swipe gesture performed on HIPD 1006). Gestures performed by user 1008 on HIPD 1006 can be provided and/or displayed on another device. For example, a swipe gestured performed on HIPD 1006 is displayed on a virtual keyboard of messaging user interface 1016 displayed by AR glasses 1004.

In some embodiments, wrist-wearable device 1002, AR glasses 1004, HIPD 1006, and/or any other communicatively coupled device can present one or more notifications to user 1008. The notification can be an indication of a new message, an incoming call, an application update, a status update, etc. User 1008 can select the notification via wrist-wearable device 1002, AR glasses 1004, and/or HIPD 1006 and can cause presentation of an application or operation associated with the notification on at least one device. For example, user 1008 can receive a notification that a message was received at wrist-wearable device 1002, AR glasses 1004, HIPD 1006, and/or any other communicatively coupled device and can then provide a user input at wrist-wearable device 1002, AR glasses 1004, and/or HIPD 1006 to review the notification, and the device detecting the user input can cause an application associated with the notification to be initiated and/or presented at wrist-wearable device 1002, AR glasses 1004, and/or HIPD 1006.

While the above example describes coordinated inputs used to interact with a messaging application, user inputs can be coordinated to interact with any number of applications including, but not limited to, gaming applications, social media applications, camera applications, web-based applications, financial applications, etc. For example, AR glasses 1004 can present to user 1008 game application data, and HIPD 1006 can be used as a controller to provide inputs to the game. Similarly, user 1008 can use wrist-wearable device 1002 to initiate a camera of AR glasses 1004, and user 1008 can use wrist-wearable device 1002, AR glasses 1004, and/or HIPD 1006 to manipulate the image capture (e.g., zoom in or out, apply filters, etc.) and capture image data.

Users may interact with the devices disclosed herein in a variety of ways. For example, as shown in FIGS. 11A and 11B, a user 1108 may interact with an AR system 1100 by donning a VR headset 1150 while holding HIPD 1106 and wearing wrist-wearable device 1102. In this example, AR system 1100 may enable a user to interact with a game 1110 by swiping their arm. One or more of VR headset 1150, HIPD 1106, and wrist-wearable device 1102 may detect this gesture and, in response, may display a sword strike in game 1110. Similarly, in FIGS. 12A and 12B, a user 1208 may interact with an AR system 1200 by donning a VR headset 1220 while wearing haptic device 1260 and wrist-wearable device 1230. In this example, AR system 1200 may enable a user to interact with a game 1210 by swiping their arm. One or more of VR headset 1220, haptic device 1260, and wrist-wearable device 1230 may detect this gesture and, in response, may display a spell being cast in game 1110.

Having discussed example AR systems, devices for interacting with such AR systems and other computing systems more generally will now be discussed in greater detail. Some explanations of devices and components that can be included in some or all of the example devices discussed below are explained herein for ease of reference. Certain types of the components described below may be more suitable for a particular set of devices, and less suitable for a different set of devices. But subsequent reference to the components explained here should be considered to be encompassed by the descriptions provided.

In some embodiments discussed below, example devices and systems, including electronic devices and systems, will be addressed. Such example devices and systems are not intended to be limiting, and one of skill in the art will understand that alternative devices and systems to the example devices and systems described herein may be used to perform the operations and construct the systems and devices that are described herein.

An electronic device may be a device that uses electrical energy to perform a specific function. An electronic device can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device may be a device that sits between two other electronic devices and/or a subset of components of one or more electronic devices and facilitates communication, data processing, and/or data transfer between the respective electronic devices and/or electronic components.

An integrated circuit may be an electronic device made up of multiple interconnected electronic components such as transistors, resistors, and capacitors. These components may be etched onto a small piece of semiconductor material, such as silicon. Integrated circuits may include analog integrated circuits, digital integrated circuits, mixed signal integrated circuits, and/or any other suitable type or form of integrated circuit. Examples of integrated circuits include application-specific integrated circuits (ASICs), processing units, central processing units (CPUs), co-processors, and accelerators.

Analog integrated circuits, such as sensors, power management circuits, and operational amplifiers, may process continuous signals and perform analog functions such as amplification, active filtering, demodulation, and mixing. Examples of analog integrated circuits include linear integrated circuits and radio frequency circuits.

Digital integrated circuits, which may be referred to as logic integrated circuits, may include microprocessors, microcontrollers, memory chips, interfaces, power management circuits, programmable devices, and/or any other suitable type or form of integrated circuit. In some embodiments, examples of integrated circuits include central processing units (CPUs), Processing units, such as CPUs, may be electronic components that are responsible for executing instructions and controlling the operation of an electronic device (e.g., a computer). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) an accelerator, such as a graphics processing unit (GPU), designed to accelerate the creation and rendering of images, videos, and animations (e.g., virtual-reality animations, such as three-dimensional modeling); (iv) a field-programmable gate array (FPGA) that can be programmed and reconfigured after manufacturing and/or can be customized to perform specific tasks, such as signal processing, cryptography, and machine learning; and/or (v) a digital signal processor (DSP) designed to perform mathematical operations on signals such as audio, video, and radio waves. One or more processors of one or more electronic devices may be used in various embodiments described herein.

Memory generally refers to electronic components in a computer or electronic device that store data and instructions for the processor to access and manipulate. Examples of memory can include: (i) random access memory (RAM) configured to store data and instructions temporarily; (ii) read-only memory (ROM) configured to store data and instructions permanently (e.g., one or more portions of system firmware, and/or boot loaders) and/or semi-permanently; (iii) flash memory, which can be configured to store data in electronic devices (e.g., USB drives, memory cards, and/or solid-state drives (SSDs)); and/or (iv) cache memory configured to temporarily store frequently accessed data and instructions. Memory, as described herein, can store structured data (e.g., SQL databases, MongoDB databases, GraphQL data, JSON data, etc.). Other examples of data stored in memory can include (i) profile data, including user account data, user settings, and/or other user data stored by the user, (ii) sensor data detected and/or otherwise obtained by one or more sensors, (iii) media content data including stored image data, audio data, documents, and the like, (iv) application data, which can include data collected and/or otherwise obtained and stored during use of an application, and/or any other types of data described herein.

Controllers may be electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or (iv) DSPs.

A power system of an electronic device may be configured to convert incoming electrical power into a form that can be used to operate the device. A power system can include various components, such as (i) a power source, which can be an alternating current (AC) adapter or a direct current (DC) adapter power supply, (ii) a charger input, which can be configured to use a wired and/or wireless connection (which may be part of a peripheral interface, such as a USB, micro-USB interface, near-field magnetic coupling, magnetic inductive and magnetic resonance charging, and/or radio frequency (RF) charging), (iii) a power-management integrated circuit, configured to distribute power to various components of the device and to ensure that the device operates within safe limits (e.g., regulating voltage, controlling current flow, and/or managing heat dissipation), and/or (iv) a battery configured to store power to provide usable power to components of one or more electronic devices.

Peripheral interfaces may be electronic components (e.g., of electronic devices) that allow electronic devices to communicate with other devices or peripherals and can provide the ability to input and output data and signals. Examples of peripheral interfaces can include (i) universal serial bus (USB) and/or micro-USB interfaces configured for connecting devices to an electronic device, (ii) Bluetooth interfaces configured to allow devices to communicate with each other, including Bluetooth low energy (BLE), (iii) near field communication (NFC) interfaces configured to be short-range wireless interfaces for operations such as access control, (iv) POGO pins, which may be small, spring-loaded pins configured to provide a charging interface, (v) wireless charging interfaces, (vi) GPS interfaces, (vii) Wi-Fi interfaces for providing a connection between a device and a wireless network, and/or (viii) sensor interfaces.

Sensors may be electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device), (ii) biopotential-signal sensors, (iii) inertial measurement units (e.g., IMUs) for detecting, for example, angular rate, force, magnetic field, and/or changes in acceleration, (iv) heart rate sensors for measuring a user's heart rate, (v) SpO2 sensors for measuring blood oxygen saturation and/or other biometric data of a user, (vi) capacitive sensors for detecting changes in potential at a portion of a user's body (e.g., a sensor-skin interface), and/or (vii) light sensors (e.g., time-of-flight sensors, infrared light sensors, visible light sensors, etc.).

Biopotential-signal-sensing components may be devices used to measure electrical activity within the body (e.g., biopotential-signal sensors). Some types of biopotential-signal sensors include (i) electroencephalography (EEG) sensors configured to measure electrical activity in the brain to diagnose neurological disorders, (ii) electrocardiography (ECG or EKG) sensors configured to measure electrical activity of the heart to diagnose heart problems, (iii) electromyography (EMG) sensors configured to measure the electrical activity of muscles and to diagnose neuromuscular disorders, and (iv) electrooculography (EOG) sensors configure to measure the electrical activity of eye muscles to detect eye movement and diagnose eye disorders.

An application stored in memory of an electronic device (e.g., software) may include instructions stored in the memory. Examples of such applications include (i) games, (ii) word processors, (iii) messaging applications, (iv) media-streaming applications, (v) financial applications, (vi) calendars. (vii) clocks, and (viii) communication interface modules for enabling wired and/or wireless connections between different respective electronic devices (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocols).

A communication interface may be a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs), protocols like HTTP and TCP/IP, etc.).

A graphics module may be a component or software module that is designed to handle graphical operations and/or processes and can include a hardware module and/or a software module.

Non-transitory computer-readable storage media may be physical devices or storage media that can be used to store electronic data in a non-transitory form (e.g., such that the data is stored permanently until it is intentionally deleted or modified).

Figure 13:
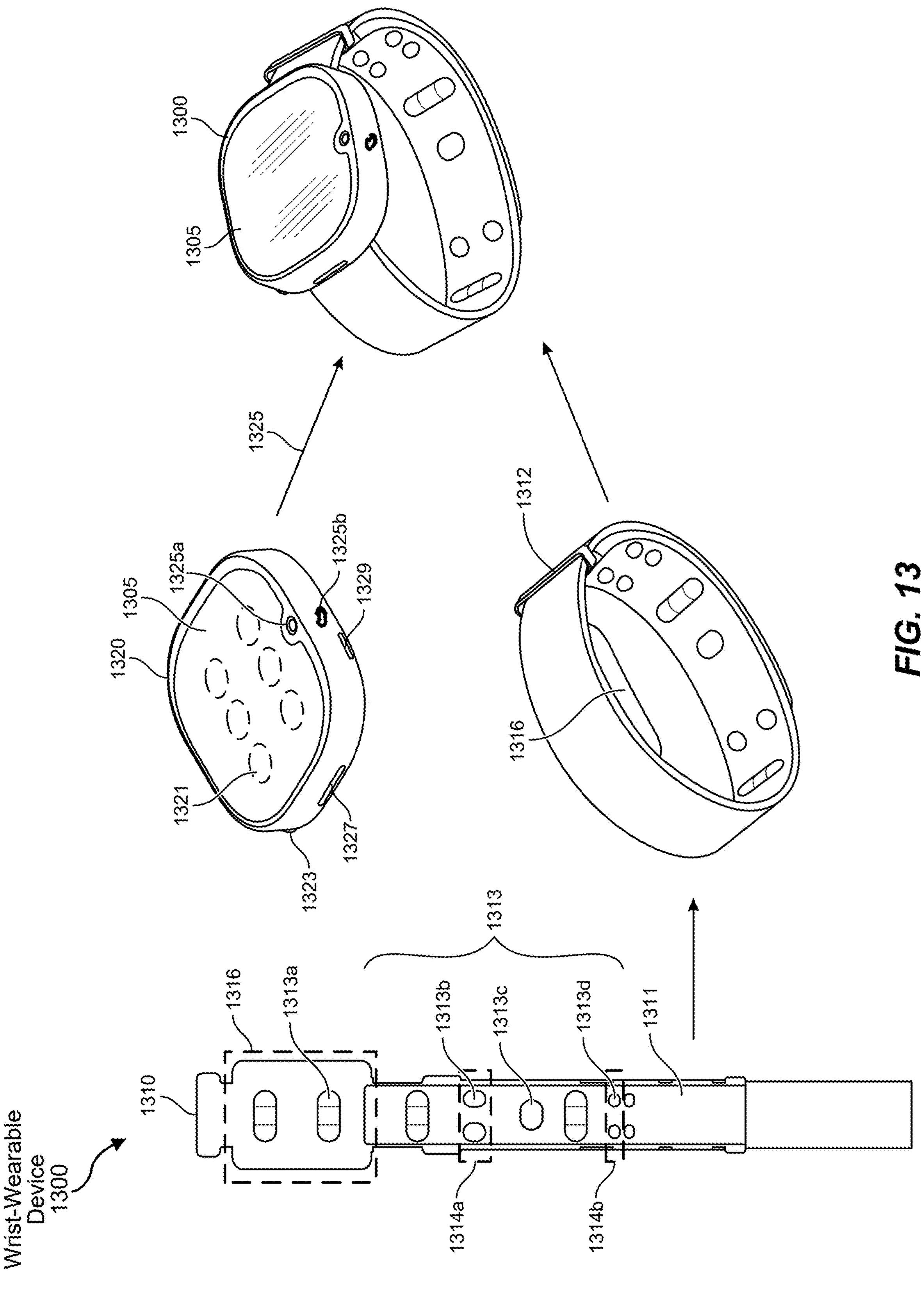
FIG. 13 is an illustration of an example wrist-wearable device of an artificial-reality system according to some embodiments of this disclosure.
Figure 14:
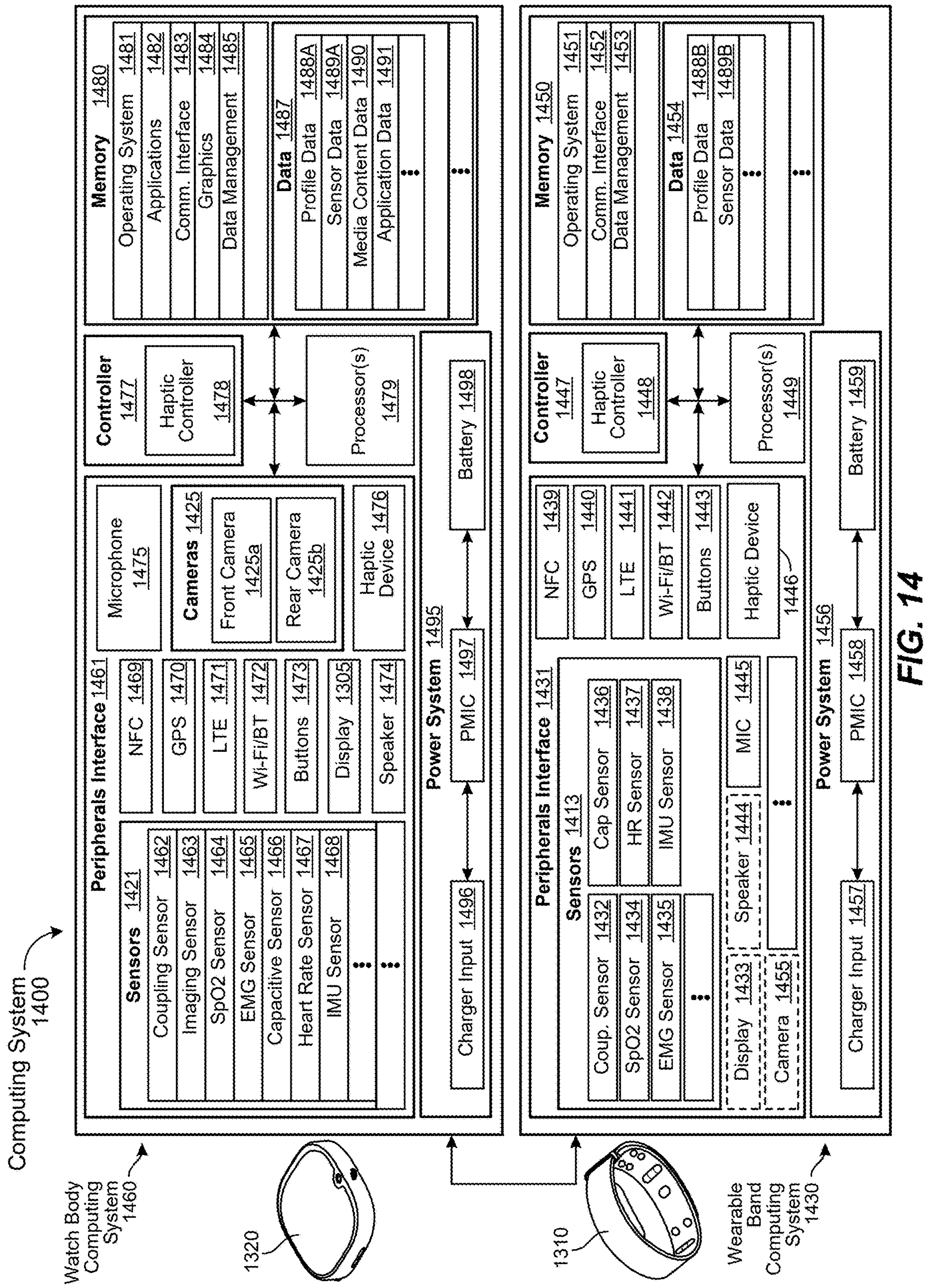
FIG. 14 is an illustration of an example wearable artificial-reality system according to some embodiments of this disclosure.

FIGS. 13 and 14 illustrate an example wrist-wearable device 1300 and an example computer system 1400, in accordance with some embodiments. Wrist-wearable device 1300 is an instance of wearable device 902 described in FIG. 9 herein, such that the wearable device 902 should be understood to have the features of the wrist-wearable device 1300 and vice versa. FIG. 14 illustrates components of the wrist-wearable device 1300, which can be used individually or in combination, including combinations that include other electronic devices and/or electronic components.

FIG. 13 shows a wearable band 1310 and a watch body 1320 (or capsule) being coupled, as discussed below, to form wrist-wearable device 1300. Wrist-wearable device 1300 can perform various functions and/or operations associated with navigating through user interfaces and selectively opening applications as well as the functions and/or operations described above with reference to FIGS. 9-12B.

As will be described in more detail below, operations executed by wrist-wearable device 1300 can include (i) presenting content to a user (e.g., displaying visual content via a display 1305), (ii) detecting (e.g., sensing) user input (e.g., sensing a touch on peripheral button 1323 and/or at a touch screen of the display 1305, a hand gesture detected by sensors (e.g., biopotential sensors)), (iii) sensing biometric data (e.g., neuromuscular signals, heart rate, temperature, sleep, etc.) via one or more sensors 1313, messaging (e.g., text, speech, video, etc.); image capture via one or more imaging devices or cameras 1325, wireless communications (e.g., cellular, near field, Wi-Fi, personal area network, etc.), location determination, financial transactions, providing haptic feedback, providing alarms, providing notifications, providing biometric authentication, providing health monitoring, providing sleep monitoring, etc.

The above-example functions can be executed independently in watch body 1320, independently in wearable band 1310, and/or via an electronic communication between watch body 1320 and wearable band 1310. In some embodiments, functions can be executed on wrist-wearable device 1300 while an AR environment is being presented (e.g., via one of AR systems 900 to 1200). The wearable devices described herein can also be used with other types of AR environments.

Wearable band 1310 can be configured to be worn by a user such that an inner surface of a wearable structure 1311 of wearable band 1310 is in contact with the user's skin. In this example, when worn by a user, sensors 1313 may contact the user's skin. In some examples, one or more of sensors 1313 can sense biometric data such as a user's heart rate, a saturated oxygen level, temperature, sweat level, neuromuscular signals, or a combination thereof. One or more of sensors 1313 can also sense data about a user's environment including a user's motion, altitude, location, orientation, gait, acceleration, position, or a combination thereof. In some embodiment, one or more of sensors 1313 can be configured to track a position and/or motion of wearable band 1310. One or more of sensors 1313 can include any of the sensors defined above and/or discussed below with respect to FIG. 13.

One or more of sensors 1313 can be distributed on an inside and/or an outside surface of wearable band 1310. In some embodiments, one or more of sensors 1313 are uniformly spaced along wearable band 1310. Alternatively, in some embodiments, one or more of sensors 1313 are positioned at distinct points along wearable band 1310. As shown in FIG. 13, one or more of sensors 1313 can be the same or distinct. For example, in some embodiments, one or more of sensors 1313 can be shaped as a pill (e.g., sensor 1313*a*), an oval, a circle a square, an oblong (e.g., sensor 1313*c*) and/or any other shape that maintains contact with the user's skin (e.g., such that neuromuscular signal and/or other biometric data can be accurately measured at the user's skin). In some embodiments, one or more sensors of 1313 are aligned to form pairs of sensors (e.g., for sensing neuromuscular signals based on differential sensing within each respective sensor). For example, sensor 1313*b* may be aligned with an adjacent sensor to form sensor pair 1314*a* and sensor 1313*d* may be aligned with an adjacent sensor to form sensor pair 1314*b*. In some embodiments, wearable band 1310 does not have a sensor pair. Alternatively, in some embodiments, wearable band 1310 has a predetermined number of sensor pairs (one pair of sensors, three pairs of sensors, four pairs of sensors, six pairs of sensors, sixteen pairs of sensors, etc.).

Wearable band 1310 can include any suitable number of sensors 1313. In some embodiments, the number and arrangement of sensors 1313 depends on the particular application for which wearable band 1310 is used. For instance, wearable band 1310 can be configured as an armband, wristband, or chest-band that include a plurality of sensors 1313 with different number of sensors 1313, a variety of types of individual sensors with the plurality of sensors 1313, and different arrangements for each use case, such as medical use cases as compared to gaming or general day-to-day use cases.

In accordance with some embodiments, wearable band 1310 further includes an electrical ground electrode and a shielding electrode. The electrical ground and shielding electrodes, like the sensors 1313, can be distributed on the inside surface of the wearable band 1310 such that they contact a portion of the user's skin. For example, the electrical ground and shielding electrodes can be at an inside surface of a coupling mechanism 1316 or an inside surface of a wearable structure 1311. The electrical ground and shielding electrodes can be formed and/or use the same components as sensors 1313. In some embodiments, wearable band 1310 includes more than one electrical ground electrode and more than one shielding electrode.

Sensors 1313 can be formed as part of wearable structure 1311 of wearable band 1310. In some embodiments, sensors 1313 are flush or substantially flush with wearable structure 1311 such that they do not extend beyond the surface of wearable structure 1311. While flush with wearable structure 1311, sensors 1313 are still configured to contact the user's skin (e.g., via a skin-contacting surface). Alternatively, in some embodiments, sensors 1313 extend beyond wearable structure 1311 a predetermined distance (e.g., 0.1-2 mm) to make contact and depress into the user's skin. In some embodiment, sensors 1313 are coupled to an actuator (not shown) configured to adjust an extension height (e.g., a distance from the surface of wearable structure 1311) of sensors 1313 such that sensors 1313 make contact and depress into the user's skin. In some embodiments, the actuators adjust the extension height between 0.01 mm-1.2 mm. This may allow a the user to customize the positioning of sensors 1313 to improve the overall comfort of the wearable band 1310 when worn while still allowing sensors 1313 to contact the user's skin. In some embodiments, sensors 1313 are indistinguishable from wearable structure 1311 when worn by the user.

Wearable structure 1311 can be formed of an elastic material, elastomers, etc., configured to be stretched and fitted to be worn by the user. In some embodiments, wearable structure 1311 is a textile or woven fabric. As described above, sensors 1313 can be formed as part of a wearable structure 1311. For example, sensors 1313 can be molded into the wearable structure 1311, be integrated into a woven fabric (e.g., sensors 1313 can be sewn into the fabric and mimic the pliability of fabric and can and/or be constructed from a series woven strands of fabric).

Wearable structure 1311 can include flexible electronic connectors that interconnect sensors 1313, the electronic circuitry, and/or other electronic components (described below in reference to FIG. 14) that are enclosed in wearable band 1310. In some embodiments, the flexible electronic connectors are configured to interconnect sensors 1313, the electronic circuitry, and/or other electronic components of wearable band 1310 with respective sensors and/or other electronic components of another electronic device (e.g., watch body 1320). The flexible electronic connectors are configured to move with wearable structure 1311 such that the user adjustment to wearable structure 1311 (e.g., resizing, pulling, folding, etc.) does not stress or strain the electrical coupling of components of wearable band 1310.

As described above, wearable band 1310 is configured to be worn by a user. In particular, wearable band 1310 can be shaped or otherwise manipulated to be worn by a user. For example, wearable band 1310 can be shaped to have a substantially circular shape such that it can be configured to be worn on the user's lower arm or wrist. Alternatively, wearable band 1310 can be shaped to be worn on another body part of the user, such as the user's upper arm (e.g., around a bicep), forearm, chest, legs, etc. Wearable band 1310 can include a retaining mechanism 1312 (e.g., a buckle, a hook and loop fastener, etc.) for securing wearable band 1310 to the user's wrist or other body part. While wearable band 1310 is worn by the user, sensors 1313 sense data (referred to as sensor data) from the user's skin. In some examples, sensors 1313 of wearable band 1310 obtain (e.g., sense and record) neuromuscular signals.

The sensed data (e.g., sensed neuromuscular signals) can be used to detect and/or determine the user's intention to perform certain motor actions. In some examples, sensors

1313 may sense and record neuromuscular signals from the user as the user performs muscular activations (e.g., movements, gestures, etc.). The detected and/or determined motor actions (e.g., phalange (or digit) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on display 1305 of wrist-wearable device 1300 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table, dynamic gestures, such as grasping a physical or virtual object, and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by sensors 1313 can be used to provide a user with an enhanced interaction with a physical object (e.g., devices communicatively coupled with wearable band 1310) and/or a virtual object in an artificial-reality application generated by an artificial-reality system (e.g., user interface objects presented on the display 1305, or another computing device (e.g., a smartphone)).

In some embodiments, wearable band 1310 includes one or more haptic devices 1446 (e.g., a vibratory haptic actuator) that are configured to provide haptic feedback (e.g., a cutaneous and/or kinesthetic sensation, etc.) to the user's skin. Sensors 1313 and/or haptic devices 1446 (shown in FIG. 14) can be configured to operate in conjunction with multiple applications including, without limitation, health monitoring, social media, games, and artificial reality (e.g., the applications associated with artificial reality).

Wearable band 1310 can also include coupling mechanism 1316 for detachably coupling a capsule (e.g., a computing unit) or watch body 1320 (via a coupling surface of the watch body 1320) to wearable band 1310. For example, a cradle or a shape of coupling mechanism 1316 can correspond to shape of watch body 1320 of wrist-wearable device 1300. In particular, coupling mechanism 1316 can be configured to receive a coupling surface proximate to the bottom side of watch body 1320 (e.g., a side opposite to a front side of watch body 1320 where display 1305 is located), such that a user can push watch body 1320 downward into coupling mechanism 1316 to attach watch body 1320 to coupling mechanism 1316. In some embodiments, coupling mechanism 1316 can be configured to receive a top side of the watch body 1320 (e.g., a side proximate to the front side of watch body 1320 where display 1305 is located) that is pushed upward into the cradle, as opposed to being pushed downward into coupling mechanism 1316. In some embodiments, coupling mechanism 1316 is an integrated component of wearable band 1310 such that wearable band 1310 and coupling mechanism 1316 are a single unitary structure. In some embodiments, coupling mechanism 1316 is a type of frame or shell that allows watch body 1320 coupling surface to be retained within or on wearable band 1310 coupling mechanism 1316 (e.g., a cradle, a tracker band, a support base, a clasp, etc.).

Coupling mechanism 1316 can allow for watch body 1320 to be detachably coupled to the wearable band 1310 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 1320 to wearable band 1310 and to decouple the watch body 1320 from the wearable band 1310. For example, a user can twist, slide, turn, push, pull, or rotate watch body 1320 relative to wearable band 1310, or a combination thereof, to attach watch body 1320 to wearable band 1310 and to detach watch body 1320 from wearable band 1310. Alternatively, as discussed below, in some embodiments, the watch body 1320 can be decoupled from the wearable band 1310 by actuation of a release mechanism 1329.

Wearable band 1310 can be coupled with watch body 1320 to increase the functionality of wearable band 1310 (e.g., converting wearable band 1310 into wrist-wearable device 1300, adding an additional computing unit and/or battery to increase computational resources and/or a battery life of wearable band 1310, adding additional sensors to improve sensed data, etc.). As described above, wearable band 1310 and coupling mechanism 1316 are configured to operate independently (e.g., execute functions independently) from watch body 1320. For example, coupling mechanism 1316 can include one or more sensors 1313 that contact a user's skin when wearable band 1310 is worn by the user, with or without watch body 1320 and can provide sensor data for determining control commands.

A user can detach watch body 1320 from wearable band 1310 to reduce the encumbrance of wrist-wearable device 1300 to the user. For embodiments in which watch body 1320 is removable, watch body 1320 can be referred to as a removable structure, such that in these embodiments wrist-wearable device 1300 includes a wearable portion (e.g., wearable band 1310) and a removable structure (e.g., watch body 1320).

Turning to watch body 1320, in some examples watch body 1320 can have a substantially rectangular or circular shape. Watch body 1320 is configured to be worn by the user on their wrist or on another body part. More specifically, watch body 1320 is sized to be easily carried by the user, attached on a portion of the user's clothing, and/or coupled to wearable band 1310 (forming the wrist-wearable device 1300). As described above, watch body 1320 can have a shape corresponding to coupling mechanism 1316 of wearable band 1310. In some embodiments, watch body 1320 includes a single release mechanism 1329 or multiple release mechanisms (e.g., two release mechanisms 1329 positioned on opposing sides of watch body 1320, such as spring-loaded buttons) for decoupling watch body 1320 from wearable band 1310. Release mechanism 1329 can include, without limitation, a button, a knob, a plunger, a handle, a lever, a fastener, a clasp, a dial, a latch, or a combination thereof.

A user can actuate release mechanism 1329 by pushing, turning, lifting, depressing, shifting, or performing other actions on release mechanism 1329. Actuation of release mechanism 1329 can release (e.g., decouple) watch body 1320 from coupling mechanism 1316 of wearable band 1310, allowing the user to use watch body 1320 independently from wearable band 1310 and vice versa. For example, decoupling watch body 1320 from wearable band 1310 can allow a user to capture images using rear-facing camera 1325*b*. Although release mechanism 1329 is shown positioned at a corner of watch body 1320, release mechanism 1329 can be positioned anywhere on watch body 1320 that is convenient for the user to actuate. In addition, in some embodiments, wearable band 1310 can also include a respective release mechanism for decoupling watch body 1320 from coupling mechanism 1316. In some embodiments, release mechanism 1329 is optional and watch body 1320 can be decoupled from coupling mechanism 1316 as described above (e.g., via twisting, rotating, etc.).

Watch body 1320 can include one or more peripheral buttons 1323 and 1327 for performing various operations at watch body 1320. For example, peripheral buttons 1323 and 1327 can be used to turn on or wake (e.g., transition from a sleep state to an active state) display 1305, unlock watch body 1320, increase or decrease a volume, increase or decrease a brightness, interact with one or more applications, interact with one or more user interfaces, etc. Additionally or alternatively, in some embodiments, display 1305 operates as a touch screen and allows the user to provide one or more inputs for interacting with watch body 1320.

In some embodiments, watch body 1320 includes one or more sensors 1321. Sensors 1321 of watch body 1320 can be the same or distinct from sensors 1313 of wearable band 1310. Sensors 1321 of watch body 1320 can be distributed on an inside and/or an outside surface of watch body 1320. In some embodiments, sensors 1321 are configured to contact a user's skin when watch body 1320 is worn by the user. For example, sensors 1321 can be placed on the bottom side of watch body 1320 and coupling mechanism 1316 can be a cradle with an opening that allows the bottom side of watch body 1320 to directly contact the user's skin. Alternatively, in some embodiments, watch body 1320 does not include sensors that are configured to contact the user's skin (e.g., including sensors internal and/or external to the watch body 1320 that are configured to sense data of watch body 1320 and the surrounding environment). In some embodiments, sensors 1321 are configured to track a position and/or motion of watch body 1320.

Watch body 1320 and wearable band 1310 can share data using a wired communication method (e.g., a Universal Asynchronous Receiver/Transmitter (UART), a USB transceiver, etc.) and/or a wireless communication method (e.g., near field communication, Bluetooth, etc.). For example, watch body 1320 and wearable band 1310 can share data sensed by sensors 1313 and 1321, as well as application and device specific information (e.g., active and/or available applications, output devices (e.g., displays, speakers, etc.), input devices (e.g., touch screens, microphones, imaging sensors, etc.).

In some embodiments, watch body 1320 can include, without limitation, a front-facing camera 1325*a* and/or a rear-facing camera 1325*b*, sensors 1321 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 1463), a touch sensor, a sweat sensor, etc.). In some embodiments, watch body 1320 can include one or more haptic devices 1476 (e.g., a vibratory haptic actuator) that is configured to provide haptic feedback (e.g., a cutaneous and/or kinesthetic sensation, etc.) to the user. Sensors 1421 and/or haptic device 1476 can also be configured to operate in conjunction with multiple applications including, without limitation, health monitoring applications, social media applications, game applications, and artificial reality applications (e.g., the applications associated with artificial reality).

As described above, watch body 1320 and wearable band 1310, when coupled, can form wrist-wearable device 1300. When coupled, watch body 1320 and wearable band 1310 may operate as a single device to execute functions (operations, detections, communications, etc.) described herein. In some embodiments, each device may be provided with particular instructions for performing the one or more operations of wrist-wearable device 1300. For example, in accordance with a determination that watch body 1320 does not include neuromuscular signal sensors, wearable band 1310 can include alternative instructions for performing associated instructions (e.g., providing sensed neuromuscular signal data to watch body 1320 via a different electronic device). Operations of wrist-wearable device 1300 can be performed by watch body 1320 alone or in conjunction with wearable band 1310 (e.g., via respective processors and/or hardware components) and vice versa. In some embodiments, operations of wrist-wearable device 1300, watch body 1320, and/or wearable band 1310 can be performed in conjunction with one or more processors and/or hardware components.

As described below with reference to the block diagram of FIG. 14, wearable band 1310 and/or watch body 1320 can each include independent resources required to independently execute functions. For example, wearable band 1310 and/or watch body 1320 can each include a power source (e.g., a battery), a memory, data storage, a processor (e.g., a central processing unit (CPU)), communications, a light source, and/or input/output devices.

FIG. 14 shows block diagrams of a computing system 1430 corresponding to wearable band 1310 and a computing system 1460 corresponding to watch body 1320 according to some embodiments. Computing system 1400 of wrist-wearable device 1300 may include a combination of components of wearable band computing system 1430 and watch body computing system 1460, in accordance with some embodiments.

Watch body 1320 and/or wearable band 1310 can include one or more components shown in watch body computing system 1460. In some embodiments, a single integrated circuit may include all or a substantial portion of the components of watch body computing system 1460 included in a single integrated circuit. Alternatively, in some embodiments, components of the watch body computing system 1460 may be included in a plurality of integrated circuits that are communicatively coupled. In some embodiments, watch body computing system 1460 may be configured to couple (e.g., via a wired or wireless connection) with wearable band computing system 1430, which may allow the computing systems to share components, distribute tasks, and/or perform other operations described herein (individually or as a single device).

Watch body computing system 1460 can include one or more processors 1479, a controller 1477, a peripherals interface 1461, a power system 1495, and memory (e.g., a memory 1480).

Power system 1495 can include a charger input 1496, a power-management integrated circuit (PMIC) 1497, and a battery 1498. In some embodiments, a watch body 1320 and a wearable band 1310 can have respective batteries (e.g., battery 1498 and 1459) and can share power with each other. Watch body 1320 and wearable band 1310 can receive a charge using a variety of techniques. In some embodiments, watch body 1320 and wearable band 1310 can use a wired charging assembly (e.g., power cords) to receive the charge. Alternatively, or in addition, watch body 1320 and/or wearable band 1310 can be configured for wireless charging. For example, a portable charging device can be designed to mate with a portion of watch body 1320 and/or wearable band 1310 and wirelessly deliver usable power to battery 1498 of watch body 1320 and/or battery 1459 of wearable band 1310. Watch body 1320 and wearable band 1310 can have independent power systems (e.g., power system 1495 and 1456, respectively) to enable each to operate independently. Watch body 1320 and wearable band 1310 can also share power (e.g., one can charge the other) via respective PMICs (e.g., PMICs 1497 and 1458) and charger inputs (e.g., 1457 and 1496) that can share power over power and ground conductors and/or over wireless charging antennas.

In some embodiments, peripherals interface 1461 can include one or more sensors 1421. Sensors 1421 can include one or more coupling sensors 1462 for detecting when watch body 1320 is coupled with another electronic device (e.g., a wearable band 1310). Sensors 1421 can include one or more imaging sensors 1463 (e.g., one or more of cameras 1425, and/or separate imaging sensors 1463 (e.g., thermal-imaging sensors)). In some embodiments, sensors 1421 can include one or more SpO2 sensors 1464. In some embodiments, sensors 1421 can include one or more biopotential-signal sensors (e.g., EMG sensors 1465, which may be disposed on an interior, user-facing portion of watch body 1320 and/or wearable band 1310). In some embodiments, sensors 1421 may include one or more capacitive sensors 1466. In some embodiments, sensors 1421 may include one or more heart rate sensors 1467. In some embodiments, sensors 1421 may include one or more IMU sensors 1468. In some embodiments, one or more IMU sensors 1468 can be configured to detect movement of a user's hand or other location where watch body 1320 is placed or held.

In some embodiments, one or more of sensors 1421 may provide an example human-machine interface. For example, a set of neuromuscular sensors, such as EMG sensors 1465, may be arranged circumferentially around wearable band 1310 with an interior surface of EMG sensors 1465 being configured to contact a user's skin. Any suitable number of neuromuscular sensors may be used (e.g., between 2 and 20 sensors). The number and arrangement of neuromuscular sensors may depend on the particular application for which the wearable device is used. For example, wearable band 1310 can be used to generate control information for controlling an augmented reality system, a robot, controlling a vehicle, scrolling through text, controlling a virtual avatar, or any other suitable control task.

In some embodiments, neuromuscular sensors may be coupled together using flexible electronics incorporated into the wireless device, and the output of one or more of the sensing components can be optionally processed using hardware signal processing circuitry (e.g., to perform amplification, filtering, and/or rectification). In other embodiments, at least some signal processing of the output of the sensing components can be performed in software such as processors 1479. Thus, signal processing of signals sampled by the sensors can be performed in hardware, software, or by any suitable combination of hardware and software, as aspects of the technology described herein are not limited in this respect.

Neuromuscular signals may be processed in a variety of ways. For example, the output of EMG sensors 1465 may be provided to an analog front end, which may be configured to perform analog processing (e.g., amplification, noise reduction, filtering, etc.) on the recorded signals. The processed analog signals may then be provided to an analog-to-digital converter, which may convert the analog signals to digital signals that can be processed by one or more computer processors. Furthermore, although this example is as discussed in the context of interfaces with EMG sensors, the embodiments described herein can also be implemented in wearable interfaces with other types of sensors including, but not limited to, mechanomyography (MMG) sensors, sonomyography (SMG) sensors, and electrical impedance tomography (EIT) sensors.

In some embodiments, peripherals interface 1461 includes a near-field communication (NFC) component 1469, a global-position system (GPS) component 1470, a long-term evolution (LTE) component 1471, and/or a Wi-Fi and/or Bluetooth communication component 1472. In some embodiments, peripherals interface 1461 includes one or more buttons 1473 (e.g., peripheral buttons 1323 and 1327 in FIG. 13), which, when selected by a user, cause operation to be performed at watch body 1320. In some embodiments, the peripherals interface 1461 includes one or more indicators, such as a light emitting diode (LED), to provide a user with visual indicators (e.g., message received, low battery, active microphone and/or camera, etc.).

Watch body 1320 can include at least one display 1305 for displaying visual representations of information or data to a user, including user-interface elements and/or three-dimensional virtual objects. The display can also include a touch screen for inputting user inputs, such as touch gestures, swipe gestures, and the like. Watch body 1320 can include at least one speaker 1474 and at least one microphone 1475 for providing audio signals to the user and receiving audio input from the user. The user can provide user inputs through microphone 1475 and can also receive audio output from speaker 1474 as part of a haptic event provided by haptic controller 1478. Watch body 1320 can include at least one camera 1425, including a front camera 1425*a* and a rear camera 1425*b*. Cameras 1425 can include ultra-wide-angle cameras, wide angle cameras, fish-eye cameras, spherical cameras, telephoto cameras, depth-sensing cameras, or other types of cameras.

Watch body computing system 1460 can include one or more haptic controllers 1478 and associated componentry (e.g., haptic devices 1476) for providing haptic events at watch body 1320 (e.g., a vibrating sensation or audio output in response to an event at the watch body 1320). Haptic controllers 1478 can communicate with one or more haptic devices 1476, such as electroacoustic devices, including a speaker of the one or more speakers 1474 and/or other audio components and/or electromechanical devices that convert energy into linear motion such as a motor, solenoid, electroactive polymer, piezoelectric actuator, electrostatic actuator, or other tactile output generating components (e.g., a component that converts electrical signals into tactile outputs on the device). Haptic controller 1478 can provide haptic events to that are capable of being sensed by a user of watch body 1320. In some embodiments, one or more haptic controllers 1478 can receive input signals from an application of applications 1482.

In some embodiments, wearable band computing system 1430 and/or watch body computing system 1460 can include memory 1480, which can be controlled by one or more memory controllers of controllers 1477. In some embodiments, software components stored in memory 1480 include one or more applications 1482 configured to perform operations at the watch body 1320. In some embodiments, one or more applications 1482 may include games, word processors, messaging applications, calling applications, web browsers, social media applications, media streaming applications, financial applications, calendars, clocks, etc. In some embodiments, software components stored in memory 1480 include one or more communication interface modules 1483 as defined above. In some embodiments, software components stored in memory 1480 include one or more graphics modules 1484 for rendering, encoding, and/or decoding audio and/or visual data and one or more data management modules 1485 for collecting, organizing, and/or providing access to data 1487 stored in memory 1480. In some embodiments, one or more of applications 1482 and/or one or more modules can work in conjunction with one another to perform various tasks at the watch body 1320.

In some embodiments, software components stored in memory 1480 can include one or more operating systems 1481 (e.g., a Linux-based operating system, an Android operating system, etc.). Memory 1480 can also include data 1487. Data 1487 can include profile data 1488A, sensor data 1489A, media content data 1490, and application data 1491.

It should be appreciated that watch body computing system 1460 is an example of a computing system within watch body 1320, and that watch body 1320 can have more or fewer components than shown in watch body computing system 1460, can combine two or more components, and/or can have a different configuration and/or arrangement of the components. The various components shown in watch body computing system 1460 are implemented in hardware, software, firmware, or a combination thereof, including one or more signal processing and/or application-specific integrated circuits.

Turning to the wearable band computing system 1430, one or more components that can be included in wearable band 1310 are shown. Wearable band computing system 1430 can include more or fewer components than shown in watch body computing system 1460, can combine two or more components, and/or can have a different configuration and/or arrangement of some or all of the components. In some embodiments, all, or a substantial portion of the components of wearable band computing system 1430 are included in a single integrated circuit. Alternatively, in some embodiments, components of wearable band computing system 1430 are included in a plurality of integrated circuits that are communicatively coupled. As described above, in some embodiments, wearable band computing system 1430 is configured to couple (e.g., via a wired or wireless connection) with watch body computing system 1460, which allows the computing systems to share components, distribute tasks, and/or perform other operations described herein (individually or as a single device).

Wearable band computing system 1430, similar to watch body computing system 1460, can include one or more processors 1449, one or more controllers 1447 (including one or more haptics controllers 1448), a peripherals interface 1431 that can includes one or more sensors 1413 and other peripheral devices, a power source (e.g., a power system 1456), and memory (e.g., a memory 1450) that includes an operating system (e.g., an operating system 1451), data (e.g., data 1454 including profile data 1488B, sensor data 1489B, etc.), and one or more modules (e.g., a communications interface module 1452, a data management module 1453, etc.).

One or more of sensors 1413 can be analogous to sensors 1421 of watch body computing system 1460. For example, sensors 1413 can include one or more coupling sensors 1432, one or more SpO2 sensors 1434, one or more EMG sensors 1435, one or more capacitive sensors 1436, one or more heart rate sensors 1437, and one or more IMU sensors 1438.

Peripherals interface 1431 can also include other components analogous to those included in peripherals interface 1461 of watch body computing system 1460, including an NFC component 1439, a GPS component 1440, an LTE component 1441, a Wi-Fi and/or Bluetooth communication component 1442, and/or one or more haptic devices 1446 as described above in reference to peripherals interface 1461. In some embodiments, peripherals interface 1431 includes one or more buttons 1443, a display 1433, a speaker 1444, a microphone 1445, and a camera 1455. In some embodiments, peripherals interface 1431 includes one or more indicators, such as an LED.

It should be appreciated that wearable band computing system 1430 is an example of a computing system within wearable band 1310, and that wearable band 1310 can have more or fewer components than shown in wearable band computing system 1430, combine two or more components, and/or have a different configuration and/or arrangement of the components. The various components shown in wearable band computing system 1430 can be implemented in one or more of a combination of hardware, software, or firmware, including one or more signal processing and/or application-specific integrated circuits.

Wrist-wearable device 1300 with respect to FIG. 13 is an example of wearable band 1310 and watch body 1320 coupled together, so wrist-wearable device 1300 will be understood to include the components shown and described for wearable band computing system 1430 and watch body computing system 1460. In some embodiments, wrist-wearable device 1300 has a split architecture (e.g., a split mechanical architecture, a split electrical architecture, etc.) between watch body 1320 and wearable band 1310. In other words, all of the components shown in wearable band computing system 1430 and watch body computing system 1460 can be housed or otherwise disposed in a combined wrist-wearable device 1300 or within individual components of watch body 1320, wearable band 1310, and/or portions thereof (e.g., a coupling mechanism 1316 of wearable band 1310).

The techniques described above can be used with any device for sensing neuromuscular signals but could also be used with other types of wearable devices for sensing neuromuscular signals (such as body-wearable or head-wearable devices that might have neuromuscular sensors closer to the brain or spinal column).

In some embodiments, wrist-wearable device 1300 can be used in conjunction with a head-wearable device (e.g., AR glasses 1500 and VR system 1610) and/or an HIPD described below, and wrist-wearable device 1300 can also be configured to be used to allow a user to control any aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable devices, attention will now be turned to example head-wearable devices, such AR glasses 1500 and VR headset 1610.

Figure 15:
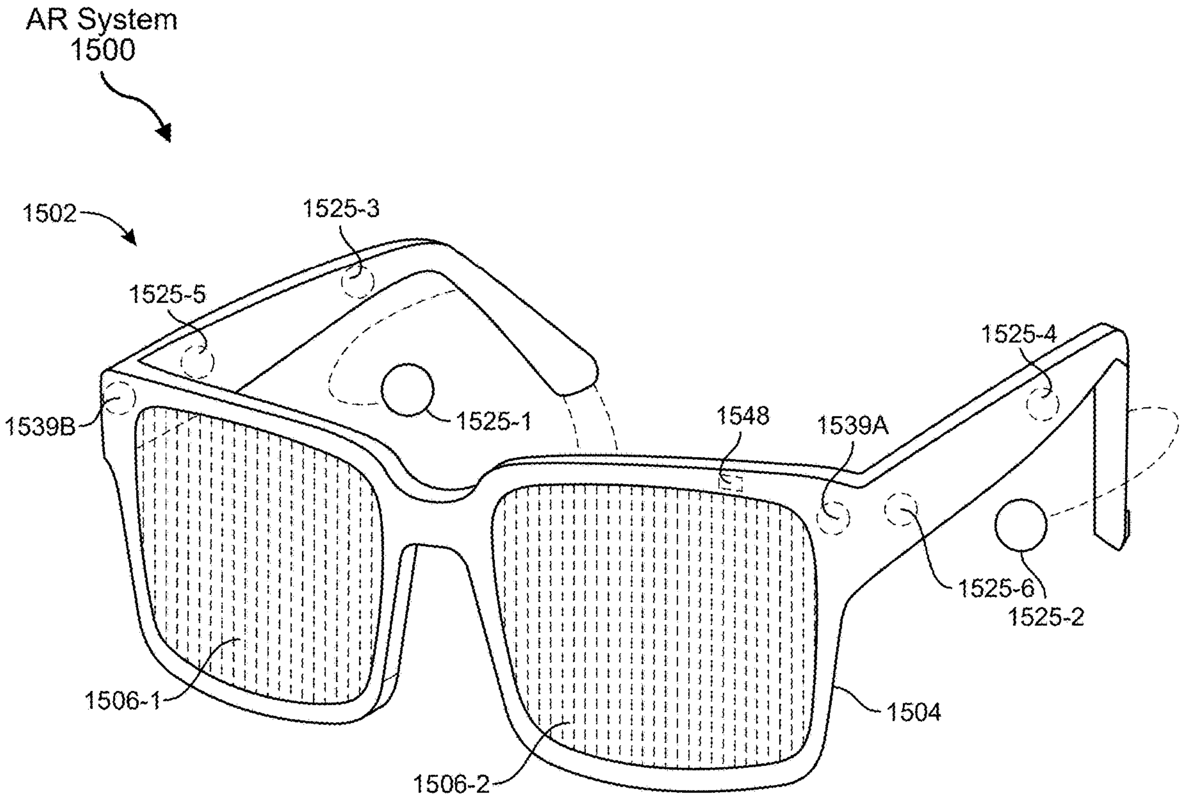
FIG. 15 is an illustration of an example augmented-reality system according to some embodiments of this disclosure.
Figure 16A:
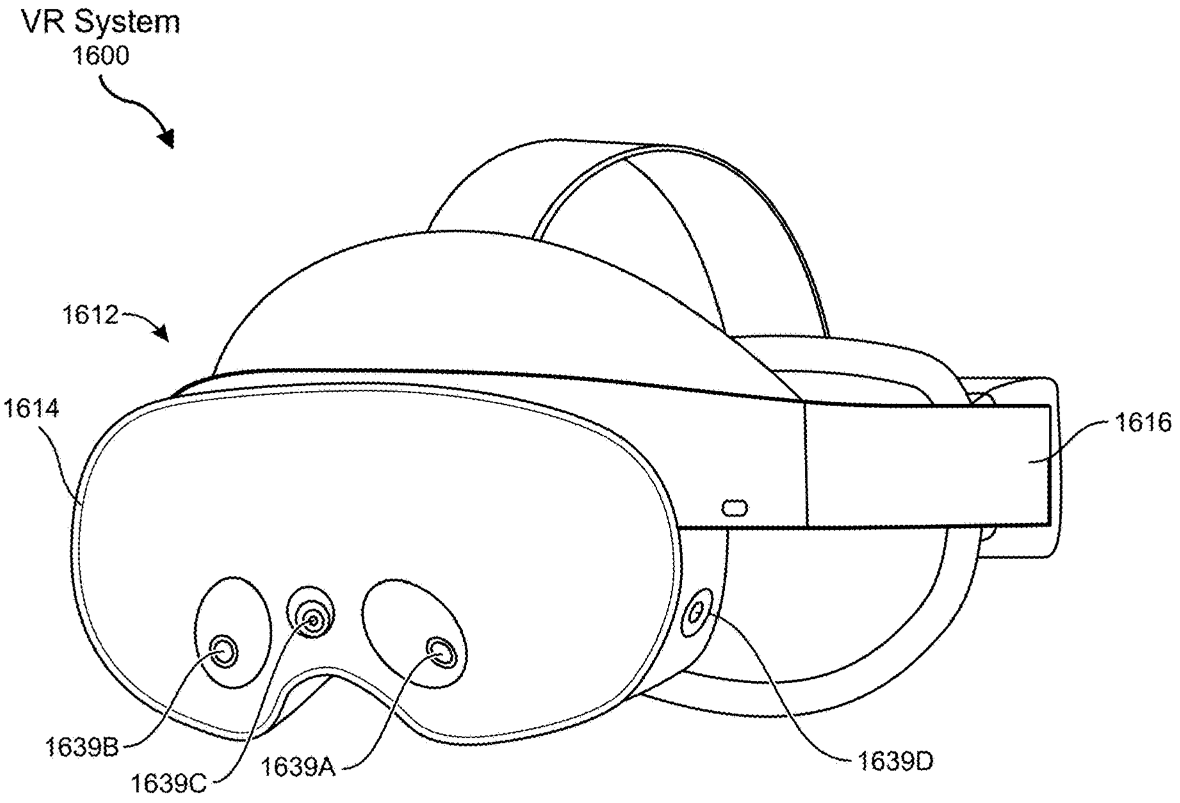
FIG. 16A is an illustration of an example virtual-reality system according to some embodiments of this disclosure.
Figure 16B:
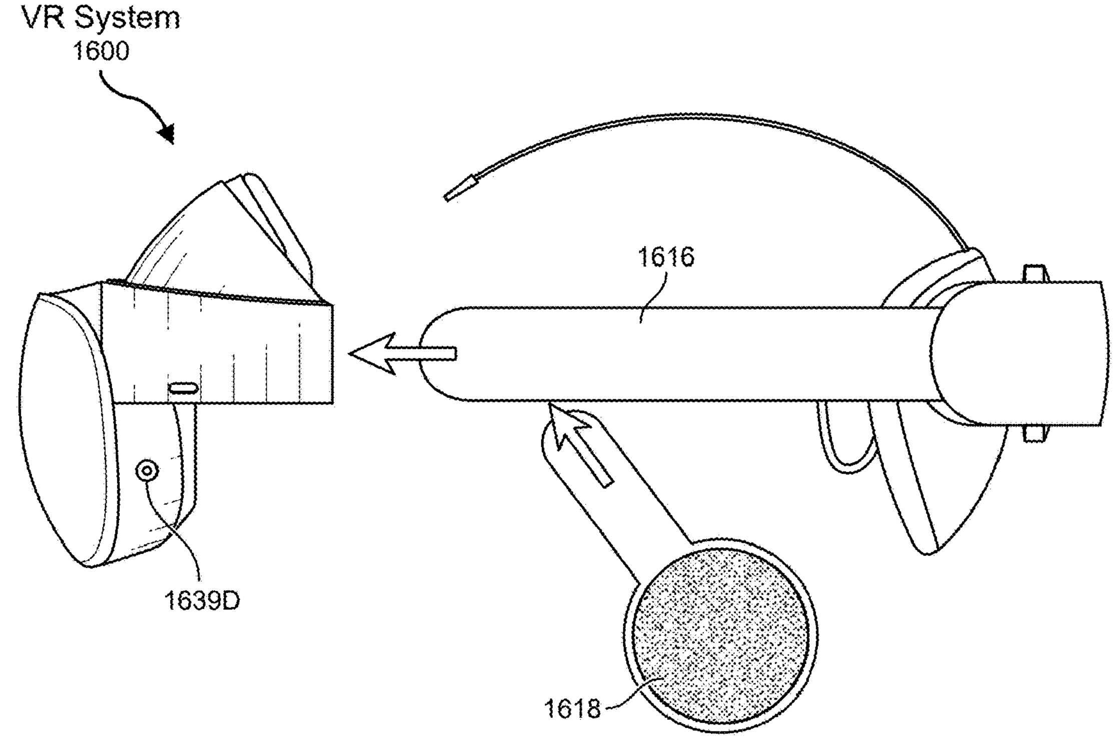
FIG. 16B is an illustration of another perspective of the virtual-reality systems shown in FIG. 16A.
Figure 17:
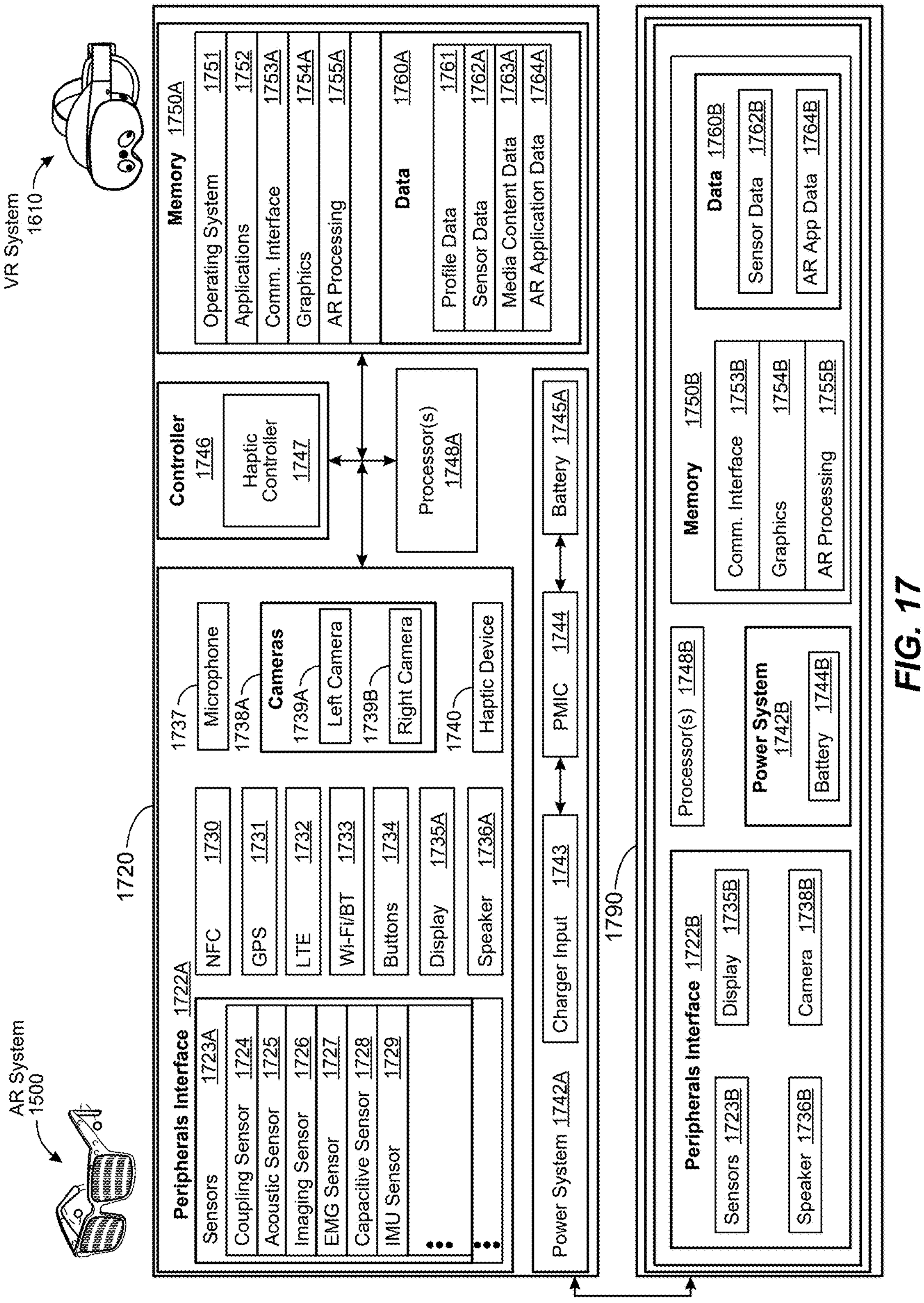
FIG. 17 is a block diagram showing system components of example artificial- and virtual-reality systems.

FIGS. 15 to 17 show example artificial-reality systems, which can be used as or in connection with wrist-wearable device 1300. In some embodiments, AR system 1500 includes an eyewear device 1502, as shown in FIG. 15. In some embodiments, VR system 1610 includes a head-mounted display (HMD) 1612, as shown in FIGS. 16A and 16B. In some embodiments, AR system 1500 and VR system 1610 can include one or more analogous components (e.g., components for presenting interactive artificial-reality environments, such as processors, memory, and/or presentation devices, including one or more displays and/or one or more waveguides), some of which are described in more detail with respect to FIG. 17. As described herein, a head-wearable device can include components of eyewear device 1502 and/or head-mounted display 1612. Some embodiments of head-wearable devices do not include any displays, including any of the displays described with respect to AR system 1500 and/or VR system 1610. While the example artificial-reality systems are respectively described herein as AR system 1500 and VR system 1610, either or both of the example AR systems described herein can be configured to present fully-immersive virtual-reality scenes presented in substantially all of a user's field of view or subtler augmented-reality scenes that are presented within a portion, less than all, of the user's field of view.

FIG. 15 show an example visual depiction of AR system 1500, including an eyewear device 1502 (which may also be described herein as augmented-reality glasses, and/or smart glasses). AR system 1500 can include additional electronic components that are not shown in FIG. 15, such as a wearable accessory device and/or an intermediary processing device, in electronic communication or otherwise configured to be used in conjunction with the eyewear device 1502. In some embodiments, the wearable accessory device and/or the intermediary processing device may be configured to couple with eyewear device 1502 via a coupling mechanism in electronic communication with a coupling sensor 1724 (FIG. 17), where coupling sensor 1724 can detect when an electronic device becomes physically or electronically coupled with eyewear device 1502. In some embodiments, eyewear device 1502 can be configured to couple to a housing 1790 (FIG. 17), which may include one or more additional coupling mechanisms configured to couple with additional accessory devices. The components shown in FIG. 15 can be implemented in hardware, software, firmware, or a combination thereof, including one or more signal-processing components and/or application-specific integrated circuits (ASICs).

Eyewear device 1502 includes mechanical glasses components, including a frame 1504 configured to hold one or more lenses (e.g., one or both lenses 1506-1 and 1506-2). One of ordinary skill in the art will appreciate that eyewear device 1502 can include additional mechanical components, such as hinges configured to allow portions of frame 1504 of eyewear device 1502 to be folded and unfolded, a bridge configured to span the gap between lenses 1506-1 and 1506-2 and rest on the user's nose, nose pads configured to rest on the bridge of the nose and provide support for eyewear device 1502, earpieces configured to rest on the user's ears and provide additional support for eyewear device 1502, temple arms configured to extend from the hinges to the earpieces of eyewear device 1502, and the like. One of ordinary skill in the art will further appreciate that some examples of AR system 1500 can include none of the mechanical components described herein. For example, smart contact lenses configured to present artificial reality to users may not include any components of eyewear device 1502.

Eyewear device 1502 includes electronic components, many of which will be described in more detail below with respect to FIG. 10. Some example electronic components are illustrated in FIG. 15, including acoustic sensors 1525-1, 1525-2, 1525-3, 1525-4, 1525-5, and 1525-6, which can be distributed along a substantial portion of the frame 1504 of eyewear device 1502. Eyewear device 1502 also includes a left camera 1539A and a right camera 1539B, which are located on different sides of the frame 1504. Eyewear device 1502 also includes a processor 1548 (or any other suitable type or form of integrated circuit) that is embedded into a portion of the frame 1504.

FIGS. 16A and 16B show a VR system 1610 that includes a head-mounted display (HMD) 1612 (e.g., also referred to herein as an artificial-reality headset, a head-wearable device, a VR headset, etc.), in accordance with some embodiments. As noted, some artificial-reality systems (e.g., AR system 1500) may, instead of blending an artificial reality with actual reality, substantially replace one or more of a user's visual and/or other sensory perceptions of the real world with a virtual experience (e.g., AR systems 1100 and 1200).

HMD 1612 includes a front body 1614 and a frame 1616 (e.g., a strap or band) shaped to fit around a user's head. In some embodiments, front body 1614 and/or frame 1616 include one or more electronic elements for facilitating presentation of and/or interactions with an AR and/or VR system (e.g., displays, IMUs, tracking emitter or detectors). In some embodiments, HMD 1612 includes output audio transducers (e.g., an audio transducer 1618), as shown in FIG. 16B. In some embodiments, one or more components, such as the output audio transducer(s) 1618 and frame 1616, can be configured to attach and detach (e.g., are detachably attachable) to HMD 1612 (e.g., a portion or all of frame 1616, and/or audio transducer 1618), as shown in FIG. 16B. In some embodiments, coupling a detachable component to HMD 1612 causes the detachable component to come into electronic communication with HMD 1612.

FIGS. 16A and 16B also show that VR system 1610 includes one or more cameras, such as left camera 1639A and right camera 1639B, which can be analogous to left and right cameras 1539A and 1539B on frame 1504 of eyewear device 1502. In some embodiments, VR system 1610 includes one or more additional cameras (e.g., cameras 1639C and 1639D), which can be configured to augment image data obtained by left and right cameras 1639A and 1639B by providing more information. For example, camera 1639C can be used to supply color information that is not discerned by cameras 1639A and 1639B. In some embodiments, one or more of cameras 1639A to 1639D can include an optional IR cut filter configured to remove IR light from being received at the respective camera sensors.

FIG. 17 illustrates a computing system 1720 and an optional housing 1790, each of which show components that can be included in AR system 1500 and/or VR system 1610. In some embodiments, more or fewer components can be included in optional housing 1790 depending on practical restraints of the respective AR system being described.

In some embodiments, computing system 1720 can include one or more peripherals interfaces 1722A and/or optional housing 1790 can include one or more peripherals interfaces 1722B. Each of computing system 1720 and optional housing 1790 can also include one or more power systems 1742A and 1742B, one or more controllers 1746 (including one or more haptic controllers 1747), one or more processors 1748A and 1748B (as defined above, including any of the examples provided), and memory 1750A and 1750B, which can all be in electronic communication with each other. For example, the one or more processors 1748A and 1748B can be configured to execute instructions stored in memory 1750A and 1750B, which can cause a controller of one or more of controllers 1746 to cause operations to be performed at one or more peripheral devices connected to peripherals interface 1722A and/or 1722B. In some embodiments, each operation described can be powered by electrical power provided by power system 1742A and/or 1742B.

In some embodiments, peripherals interface 1722A can include one or more devices configured to be part of computing system 1720, some of which have been defined above and/or described with respect to the wrist-wearable devices shown in FIGS. 13 and 14. For example, peripherals interface 1722A can include one or more sensors 1723A. Some example sensors 1723A include one or more coupling sensors 1724, one or more acoustic sensors 1725, one or more imaging sensors 1726, one or more EMG sensors 1727, one or more capacitive sensors 1728, one or more IMU sensors 1729, and/or any other types of sensors explained above or described with respect to any other embodiments discussed herein.

In some embodiments, peripherals interfaces 1722A and 1722B can include one or more additional peripheral devices, including one or more NFC devices 1730, one or more GPS devices 1731, one or more LTE devices 1732, one or more Wi-Fi and/or Bluetooth devices 1733, one or more buttons 1734 (e.g., including buttons that are slidable or otherwise adjustable), one or more displays 1735A and 1735B, one or more speakers 1736A and 1736B, one or more microphones 1737, one or more cameras 1738A and 1738B (e.g., including the left camera 1739A and/or a right camera 1739B), one or more haptic devices 1740, and/or any other types of peripheral devices defined above or described with respect to any other embodiments discussed herein.

AR systems can include a variety of types of visual feedback mechanisms (e.g., presentation devices). For example, display devices in AR system 1500 and/or VR system 1610 can include one or more liquid-crystal displays (LCDs), light emitting diode (LED) displays, organic LED (OLED) displays, and/or any other suitable types of display screens. Artificial-reality systems can include a single display screen (e.g., configured to be seen by both eyes), and/or can provide separate display screens for each eye, which can allow for additional flexibility for varifocal adjustments and/or for correcting a refractive error associated with a user's vision. Some embodiments of AR systems also include optical subsystems having one or more lenses (e.g., conventional concave or convex lenses, Fresnel lenses, or adjustable liquid lenses) through which a user can view a display screen.

For example, respective displays 1735A and 1735B can be coupled to each of the lenses 1506-1 and 1506-2 of AR system 1500. Displays 1735A and 1735B may be coupled to each of lenses 1506-1 and 1506-2, which can act together or independently to present an image or series of images to a user. In some embodiments, AR system 1500 includes a single display 1735A or 1735B (e.g., a near-eye display) or more than two displays 1735A and 1735B. In some embodiments, a first set of one or more displays 1735A and 1735B can be used to present an augmented-reality environment, and a second set of one or more display devices 1735A and 1735B can be used to present a virtual-reality environment. In some embodiments, one or more waveguides are used in conjunction with presenting artificial-reality content to the user of AR system 1500 (e.g., as a means of delivering light from one or more displays 1735A and 1735B to the user's eyes). In some embodiments, one or more waveguides are fully or partially integrated into the eyewear device 1502. Additionally, or alternatively to display screens, some artificial-reality systems include one or more projection systems. For example, display devices in AR system 1500 and/or VR system 1610 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. Artificial-reality systems can also be configured with any other suitable type or form of image projection system. In some embodiments, one or more waveguides are provided additionally or alternatively to the one or more display(s) 1735A and 1735B.

Computing system 1720 and/or optional housing 1790 of AR system 1500 or VR system 1610 can include some or all of the components of a power system 1742A and 1742B. Power systems 1742A and 1742B can include one or more charger inputs 1743, one or more PMICs 1744, and/or one or more batteries 1745A and 1744B.

Memory 1750A and 1750B may include instructions and data, some or all of which may be stored as non-transitory computer-readable storage media within the memories 1750A and 1750B. For example, memory 1750A and 1750B can include one or more operating systems 1751, one or more applications 1752, one or more communication interface applications 1753A and 1753B, one or more graphics applications 1754A and 1754B, one or more AR processing applications 1755A and 1755B, and/or any other types of data defined above or described with respect to any other embodiments discussed herein.

Memory 1750A and 1750B also include data 1760A and 1760B, which can be used in conjunction with one or more of the applications discussed above. Data 1760A and 1760B can include profile data 1761, sensor data 1762A and 1762B, media content data 1763A, AR application data 1764A and 1764B, and/or any other types of data defined above or described with respect to any other embodiments discussed herein.

In some embodiments, controller 1746 of eyewear device 1502 may process information generated by sensors 1723A and/or 1723B on eyewear device 1502 and/or another electronic device within AR system 1500. For example, controller 1746 can process information from acoustic sensors 1525-1 and 1525-2. For each detected sound, controller 1746 can perform a direction of arrival (DOA) estimation to estimate a direction from which the detected sound arrived at eyewear device 1502 of R system 1500. As one or more of acoustic sensors 1725 (e.g., the acoustic sensors 1525-1, 1525-2) detects sounds, controller 1746 can populate an audio data set with the information (e.g., represented in FIG. 10 as sensor data 1762A and 1762B).

In some embodiments, a physical electronic connector can convey information between eyewear device 1502 and another electronic device and/or between one or more processors 1548, 1748A, 1748B of AR system 1500 or VR system 1610 and controller 1746. The information can be in the form of optical data, electrical data, wireless data, or any other transmittable data form. Moving the processing of information generated by eyewear device 1502 to an intermediary processing device can reduce weight and heat in the eyewear device, making it more comfortable and safer for a user. In some embodiments, an optional wearable accessory device (e.g., an electronic neckband) is coupled to eyewear device 1502 via one or more connectors. The connectors can be wired or wireless connectors and can include electrical and/or non-electrical (e.g., structural) components. In some embodiments, eyewear device 1502 and the wearable accessory device can operate independently without any wired or wireless connection between them.

In some situations, pairing external devices, such as an intermediary processing device (e.g., HIPD 906, 1006, 1106) with eyewear device 1502 (e.g., as part of AR system 1500) enables eyewear device 1502 to achieve a similar form factor of a pair of glasses while still providing sufficient battery and computation power for expanded capabilities. Some, or all, of the battery power, computational resources, and/or additional features of AR system 1500 can be provided by a paired device or shared between a paired device and eyewear device 1502, thus reducing the weight, heat profile, and form factor of eyewear device 1502 overall while allowing eyewear device 1502 to retain its desired functionality. For example, the wearable accessory device can allow components that would otherwise be included on eyewear device 1502 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on eyewear device 1502 standing alone. Because weight carried in the wearable accessory device can be less invasive to a user than weight carried in the eyewear device 1502, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

AR systems can include various types of computer vision components and subsystems. For example, AR system 1500 and/or VR system 1610 can include one or more optical sensors such as two-dimensional (2D) or three-dimensional (3D) cameras, time-of-flight depth sensors, structured light transmitters and detectors, single-beam or sweeping laser rangefinders, 3D LiDAR sensors, and/or any other suitable type or form of optical sensor. An AR system can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 16A and 16B show VR system 1610 having cameras 1639A to 1639D, which can be used to provide depth information for creating a voxel field and a two-dimensional mesh to provide object information to the user to avoid collisions.

In some embodiments, AR system 1500 and/or VR system 1610 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

In some embodiments of an artificial reality system, such as AR system 1500 and/or VR system 1610, ambient light (e.g., a live feed of the surrounding environment that a user would normally see) can be passed through a display element of a respective head-wearable device presenting aspects of the AR system. In some embodiments, ambient light can be passed through a portion less that is less than all of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable device, and an amount of ambient light (e.g., 15-50% of the ambient light) can be passed through the user interface element such that the user can distinguish at least a portion of the physical environment over which the user interface element is being displayed.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data, output a result of the transformation to control a display, use the result of the transformation to control pixels of a display, and store the result of the transformation to buffer the control signals. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term “computer-readable medium” generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms “connected to” and “coupled to” (and their derivatives), as used in the specification and claims, are to be construed as permitting both direct and indirect (i.e., via other elements or components) connection. In addition, the terms “a” or “an,” as used in the specification and claims, are to be construed as meaning “at least one of.” Finally, for ease of use, the terms “including” and “having” (and their derivatives), as used in the specification and claims, are interchangeable with and have the same meaning as the word “comprising.”

What is claimed is:

1. A method comprising:

rendering frame data including a plurality of pixel data values;

converting, for each of the pixel data values, a first portion of the pixel data value using a first digital driving scheme;

converting, for each of the pixel data values, a second portion of the pixel data value using a second digital driving scheme; and displaying the frame data by driving a plurality of pixels of a display using pulse width modulation based on a converted pixel value comprising the converted first and second portions of the pixel data value that corresponds to each of the plurality of pixels.

2. The method of claim 1, wherein the first digital driving scheme corresponds to a ramp driving scheme converting discrete non-uniform pulses represented by bits into a continuous pulse represented by additional bits.

3. The method of claim 1, wherein the first digital driving scheme corresponds to a modified ramp driving scheme converting discrete non-uniform pulses represented by bits into a continuous pulse represented by additional bits and at least one separate discrete pulse.

4. The method of claim 1, wherein the second digital driving scheme corresponds to a subframe scheme converting discrete non-uniform pulses represented by bits into interleaved uniform pulses represented by rearranged bits.

5. The method of claim 1, wherein the first portion corresponds to upper bits of the pixel data value and the second portion corresponds to lower bits of the pixel data value.

6. The method of claim 1, further comprising:

buffering a line of converted pixel values in a line buffer; and driving a line of pixels using the converted pixel values in the line buffer.

7. The method of claim 6, further comprising buffering, in the line buffer, bit values of a first bit index from each of the converted pixel values for a first line of the frame data.

8. The method of claim 7, further comprising buffering, in the line buffer, bit values of the first bit index from each of the converted pixel values for a second line of the frame data after driving a first line of pixels based on the first bit index.

9. The method of claim 8, further comprising buffering, in the line buffer, bit values of a second bit index from each of the converted pixel values for the first line of the frame data after driving the second line of pixels based on the first bit index.

10. A system comprising:

at least one physical processor;

physical memory comprising computer-executable instructions that, when executed by the physical processor, cause the physical processor to:

render frame data including a plurality of pixel data values;

convert, for each of the pixel data values, a first portion of the pixel data value using a first digital driving scheme; and convert, for each of the pixel data values, a second portion of the pixel data value using a second digital driving scheme; and a display configured to display the frame data by driving a plurality of pixels of the display using pulse width modulation based on a converted pixel value comprising the converted first and second portions of the pixel data value that corresponds to each of the plurality of pixels.

11. The system of claim 10, wherein the first digital driving scheme corresponds to a ramp driving scheme converting discrete non-uniform pulses represented by bits into a continuous pulse represented by additional bits.

12. The system of claim 10, wherein the first digital driving scheme corresponds to a modified ramp driving scheme converting discrete non-uniform pulses represented by bits into a continuous pulse represented by additional bits and at least one separate discrete pulse.

13. The system of claim 10, wherein the second digital driving scheme corresponds to a subframe scheme converting discrete non-uniform pulses represented by bits into interleaved uniform pulses represented by rearranged bits.

14. The system of claim 10, wherein the first portion corresponds to upper bits of the pixel data value and the second portion corresponds to lower bits of the pixel data value.

15. The system of claim 10, wherein the instructions further cause the physical processor to:

buffer a line of converted pixel values in a line buffer; and drive a line of pixels using the converted pixel values in the line buffer.

16. The system of claim 10, wherein the instructions further cause the physical processor to:

buffer, in a line buffer, bit values of a first bit index from each of the converted pixel values for a first line of the frame data;

driving a first line of pixels based on the first bit index;

buffering, in the line buffer, bit values of the first bit index from each of the converted pixel values for a second line of the frame data after driving the first line of pixels based on the first bit index;

driving the second line of pixels based on the first bit index; and buffering, in the line buffer, bit values of a second bit index from each of the converted pixel values for the first line of the frame data after driving the second line of pixels based on the first bit index.

17. A non-transitory computer-readable medium comprising one or more computer-executable instructions that, when executed by at least one processor of a computing device, cause the computing device to:

render frame data including a plurality of pixel data values;

convert, for each of the pixel data values, a first portion of the pixel data value using a first digital driving scheme;

convert, for each of the pixel data values, a second portion of the pixel data value using a second digital driving scheme; and display the frame data by driving a plurality of pixels of a display using pulse width modulation based on a converted pixel value comprising the converted first and second portions of the pixel data value that corresponds to each of the plurality of pixels.

18. The non-transitory computer-readable medium of claim 17, wherein:

the first digital driving scheme corresponds to a ramp driving scheme converting discrete non-uniform pulses represented by bits into a continuous pulse represented by additional bits; and the second digital driving scheme corresponds to a subframe scheme converting discrete non-uniform pulses represented by bits into interleaved uniform pulses represented by rearranged bits.

19. The non-transitory computer-readable medium of claim 17, wherein the first portion corresponds to upper bits of the pixel data value and the second portion corresponds to lower bits of the pixel data value.

20. The non-transitory computer-readable medium of claim 17, wherein the instructions further cause the computing device to:

buffer, in a line buffer, bit values of a first bit index from each of the converted pixel values for a first line of the frame data;

drive a first line of pixels based on the first bit index;

buffer, in the line buffer, bit values of the first bit index from each of the converted pixel values for a second line of the frame data after driving the first line of pixels based on the first bit index;

drive the second line of pixels based on the first bit index; and buffer, in the line buffer, bit values of a second bit index from each of the converted pixel values for the first line of the frame data after driving the second line of pixels based on the first bit index.

* * * * *